United States Patent
Perez-Ramirez et al.

(10) Patent No.: US 9,923,638 B1
(45) Date of Patent: Mar. 20, 2018

(54) CLOCK TRACKING ALGORITHM FOR TWINKLE VPPM IN OPTICAL CAMERA COMMUNICATION SYSTEMS

(71) Applicant: Intel Corporation, Santa Clara, CA (US)

(72) Inventors: Javier Perez-Ramirez, Beaverton, OR (US); Richard D. Roberts, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/388,533

(22) Filed: Dec. 22, 2016

(51) Int. Cl.
*H04B 10/00* (2013.01)
*H04B 10/524* (2013.01)
(Continued)

(52) U.S. Cl.
CPC ......... *H04B 10/524* (2013.01); *H04B 10/116* (2013.01); *H04B 10/502* (2013.01);
(Continued)

(58) Field of Classification Search
CPC ... H04B 10/11; H04B 10/114; H04B 10/1141; H04B 10/116
See application file for complete search history.

(56) References Cited

U.S. PATENT DOCUMENTS

| 4,344,180 A | 8/1982 | Cummiskey |
| 4,355,423 A | 10/1982 | Theall |

(Continued)

FOREIGN PATENT DOCUMENTS

| WO | 2012/002431 A1 | 1/2012 |
| WO | 2017/116604 A1 | 7/2017 |

OTHER PUBLICATIONS

Roberts et al., "Techniques for Optical Wireless Communication", U.S. Appl. No. 15/088,897, filed Apr. 1, 2016, 69 Pages.
(Continued)

*Primary Examiner* — Daniel Dobson
(74) *Attorney, Agent, or Firm* — Alpine Technology Law Group LLC

(57) ABSTRACT

Optical signaling is implemented by modulating visible light with variable pulse position modulation (VPPM). VPPM is a composite waveform and its optical signal includes a Start Frame Delimiter (SFD) which indicates start of optical signaling. To identify modulated lights, the duty cycle is periodically changed in the waveform to induce an AM envelope at a frequency higher than the response of the human eye. The signal is then sampled via a camera producing an alias frequency that produces noticeable blinking. Because the communication is asynchronous, the desired camera frame rate ($f_c$) in relationship to the modulation bit rate timing clock (or symbol rate, $f_s$) is only approximate. Consequently, a frequency offset develops between the camera frame rate ($f_c$) and the symbol rate ($f_s$) in transmission of long packets. The disclosed embodiments provide a detection algorithm, system and apparatus to provide clock offset tracking and correction.

24 Claims, 30 Drawing Sheets

(51) Int. Cl.
  *H04B 10/116*    (2013.01)
  *H04B 10/50*     (2013.01)
  *H04N 5/376*     (2011.01)
  *H04N 5/225*     (2006.01)
  *H04N 5/232*     (2006.01)
  *H04J 14/00*     (2006.01)

(52) U.S. Cl.
  CPC ....... *H04N 5/2256* (2013.01); *H04N 5/23245* (2013.01); *H04N 5/3765* (2013.01)

(56) References Cited

U.S. PATENT DOCUMENTS

| | | | |
|---|---|---|---|
| 4,882,776 | A | 11/1989 | Uzawa et al. |
| 5,295,012 | A | 3/1994 | Wilson et al. |
| 5,319,487 | A | 6/1994 | Sato et al. |
| 5,517,518 | A | 5/1996 | Morson et al. |
| 5,710,774 | A | 1/1998 | Suh et al. |
| 5,808,760 | A | 9/1998 | Gfeller |
| 7,043,541 | B1 | 5/2006 | Bechtolsheim et al. |
| 7,082,425 | B2 | 7/2006 | Guy et al. |
| 7,376,152 | B2 | 5/2008 | Saado |
| 7,953,324 | B2 | 5/2011 | Leung et al. |
| 7,991,296 | B1 | 8/2011 | Johnston et al. |
| 8,334,901 | B1 | 12/2012 | Ganick et al. |
| 8,406,633 | B1 | 3/2013 | Johnston et al. |
| 8,818,204 | B2 | 8/2014 | Roberts |
| 8,855,249 | B2 | 10/2014 | Nemeth |
| 8,861,976 | B2 | 10/2014 | Roberts et al. |
| 9,065,629 | B2 | 6/2015 | Helmschmidt |
| 9,148,250 | B2 | 9/2015 | Roberts et al. |
| 9,178,615 | B2 | 11/2015 | Roberts et al. |
| 9,203,541 | B2 | 12/2015 | Roberts et al. |
| 9,385,807 | B2 | 7/2016 | Roberts |
| 2002/0054409 | A1 | 5/2002 | Bartur et al. |
| 2002/0172103 | A1 | 11/2002 | Yamawaki |
| 2003/0086366 | A1 | 5/2003 | Branlund et al. |
| 2003/0156603 | A1 | 8/2003 | Rakib et al. |
| 2004/0005023 | A1 | 1/2004 | Ham et al. |
| 2004/0161246 | A1 | 8/2004 | Matsushita et al. |
| 2004/0196926 | A1 | 10/2004 | Chien et al. |
| 2005/0123069 | A1 | 6/2005 | Akasaka |
| 2007/0242337 | A1* | 10/2007 | Bradley ............... B60Q 1/0017 359/237 |
| 2008/0187085 | A1 | 8/2008 | Nuth |
| 2008/0232509 | A1 | 9/2008 | Jonsson et al. |
| 2009/0097588 | A1 | 4/2009 | El-Agha et al. |
| 2011/0128384 | A1 | 6/2011 | Tiscareno et al. |
| 2013/0129349 | A1 | 5/2013 | Maxik et al. |
| 2014/0003823 | A1 | 1/2014 | Roberts et al. |
| 2014/0006907 | A1 | 1/2014 | Roberts et al. |
| 2014/0093238 | A1* | 4/2014 | Roberts ............... H04B 10/116 398/43 |
| 2014/0093249 | A1 | 4/2014 | Roberts et al. |
| 2014/0219663 | A1 | 8/2014 | Roberts |
| 2014/0270799 | A1 | 9/2014 | Roberts et al. |
| 2014/0308048 | A1 | 10/2014 | Roberts et al. |
| 2015/0092791 | A1 | 4/2015 | Cornett et al. |
| 2015/0280817 | A1 | 10/2015 | Roberts |
| 2016/0047888 | A1 | 2/2016 | Roberts |
| 2016/0191163 | A1 | 6/2016 | Preston et al. |
| 2017/0085337 | A1 | 3/2017 | Cornett et al. |
| 2017/0187455 | A1 | 6/2017 | Roberts et al. |

OTHER PUBLICATIONS

Notice of Allowance received for U.S. Appl. No. 15/088,897 dated Sep. 6, 2017, 5 pages.
Office Action received for U.S. Appl. No. 15/088,897 dated Jun. 1, 2017, 7 pages.
Office Action received for U.S. Appl. No. 15/088,897 dated Feb. 1, 2017, 7 pages.
International Search Report and Written Opinion received for International Application No. PCT/US2016/064384, dated Mar. 16, 2017, 12 pages.
Office Action received for U.S. Appl. No. 14/210,390 dated May 12, 2017, 13 pages.
Office Action received for U.S. Appl. No. 14/210,390 dated Oct. 31, 2016, 12 pages.
Office Action received for U.S. Appl. No. 14/210,390 dated Apr. 27, 2016, 13 pages.
Office Action received for U.S. Appl. No. 14/210,390 dated Aug. 11, 2015, 14 pages.

\* cited by examiner

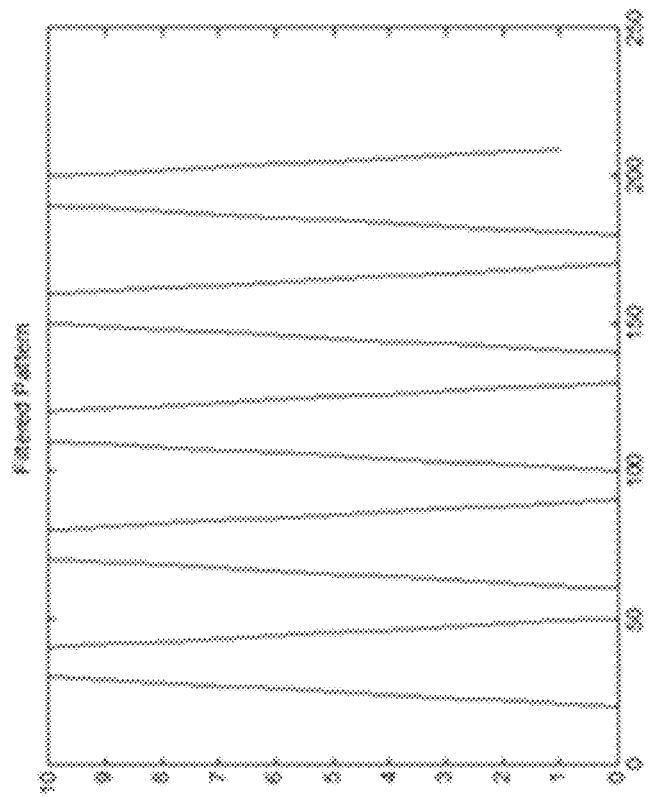
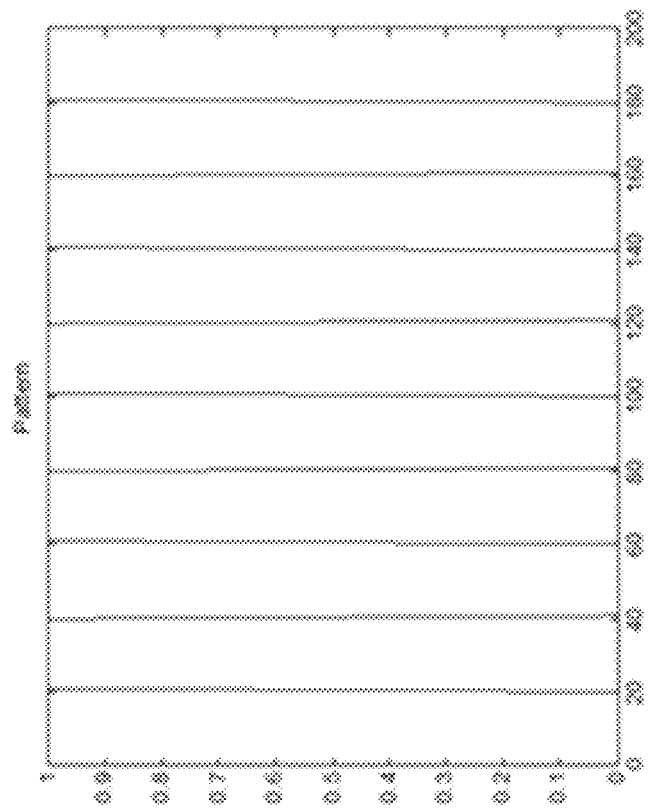
FIG. 19

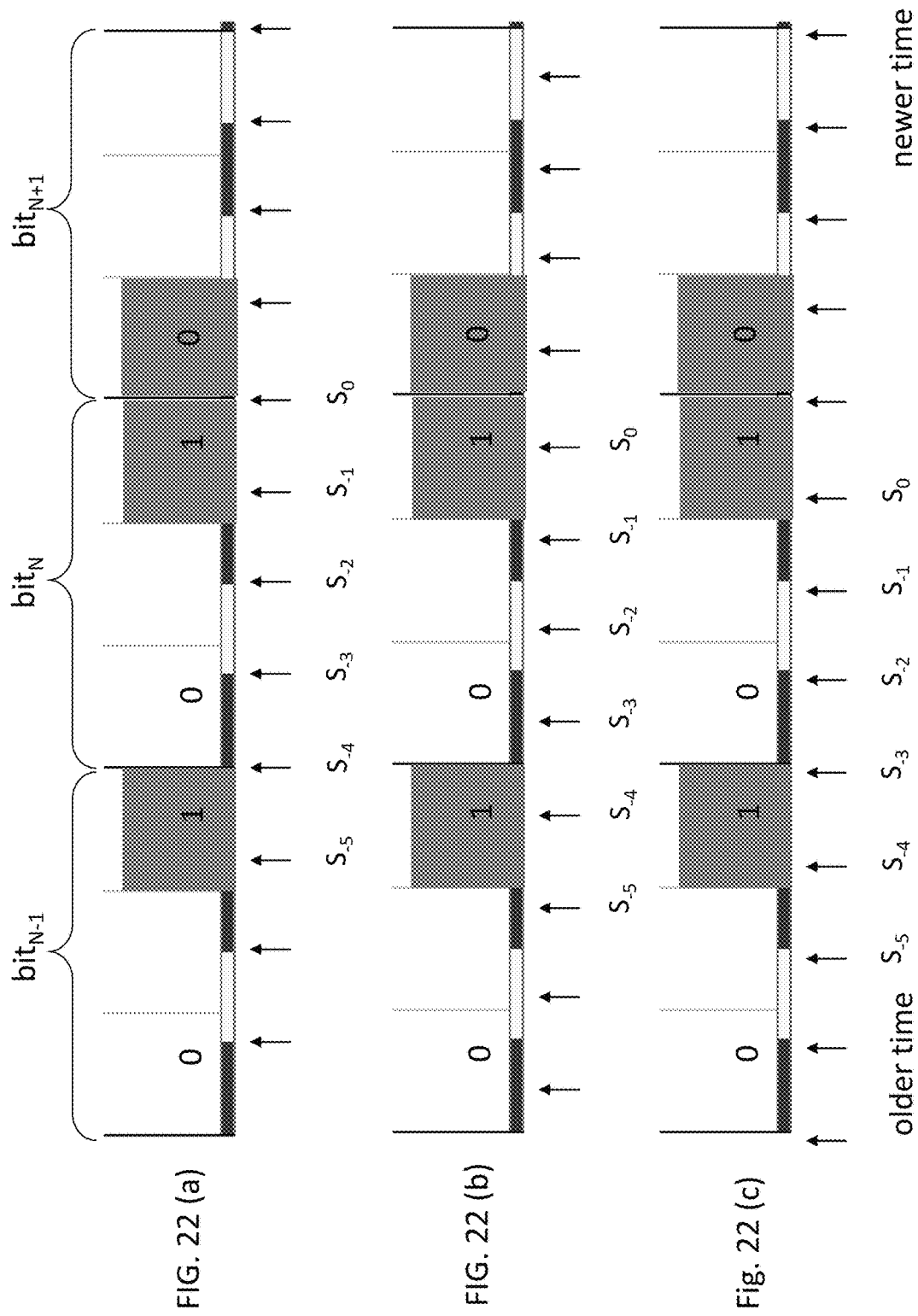

4 sample hard decisions and tracking decisions

Table A

| $S_{-3}, S_{-2}, S_{-1}, S_0$ | Previous Bit | Current Bit Decision | Tracking Action |
|---|---|---|---|
| 0000 | 0 |  |  |
| 0001 | 0 | 1 | No action |
| 0010 | 0 | 1 | Slow |
| 0011 | 0 | 1 | No action |
| 0100 | 0 | 0 | Fast |
| 0101 | 0 |  |  |
| 0110 | 0 | 0 (if $S_{-2}=1$)/1 (if $S_{-2}=0$) | Fast / Slow |
| 0111 | 0 | 1 | No action |
| 1000 | 0 | 0 | No action |
| 1001 | 0 | 0 | Slow |
| 1010 | 0 |  |  |
| 1011 | 0 | 0 | No action |
| 1100 | 0 | 0 | Slow |
| 1101 | 0 | 0 | No action |
| 1110 | 0 |  |  |
| 1111 | 0 |  |  |

Table B

| $S_{-3}, S_{-2}, S_{-1}, S_0$ | Previous Bit | Current Bit Decision | Tracking Action |
|---|---|---|---|
| 0000 | 1 |  |  |
| 0001 | 1 | 1 | No action |
| 0010 | 1 | 1 | Slow |
| 0011 | 1 | 1 | No action |
| 0100 | 1 |  |  |
| 0101 | 1 |  |  |
| 0110 | 1 | 1 | Slow |
| 0111 | 1 | 1 | No action |
| 1000 | 1 | 0 | No action |
| 1001 | 1 | 1 (if $S_{-2}=0$)/0 (if $S_{-2}=1$) | Fast / Slow |
| 1010 | 1 | 1 | Fast |
| 1011 | 1 | 0 | No action |
| 1100 | 1 | 0 | Slow |
| 1101 | 1 | 0 | No action |
| 1110 | 1 |  |  |
| 1111 | 1 |  |  |

Slow – next symbol, keep current last sample and ingest 3 new samples
Fast – next symbol take 5 samples and discard the first

*FIG. 23*

CLOCK TRACKING ALGORITHM FOR TWINKLE VPPM IN OPTICAL CAMERA COMMUNICATION SYSTEMS

BACKGROUND

Field

The application generally relates to method, system and apparatus for camera tracking of asynchronous variable pulse position modulation light (VPPM). More specific embodiments of the disclosure relate to method and apparatus to track and compensate frequency offset between the symbol rate of incoming light and the frame rate of the camera which receives the symbols contained in the incoming light.

Description of Related Art

Wireless communication is the transfer of information between two or more points that are not connected by an electrical conductor. Optical communication is a form of wireless communication that uses light to carry information. Optical wireless communication is a form of optical communication in which unguided visible, infrared (IR), or ultraviolet (UV) light is used to carry communication signals.

A composite optical waveform consists of two parts. A lower frequency time varying amplitude component that, when subsampled by a low frame rate camera, results in alias induced flicker or blinking (also known as "twinkle") which is useful for quickly identifying which light sources are modulated with data. And a high data rate portion using variable pulse position modulation (VPPM) that varies the duty cycle of the pulses to generate the lower frequency time varying amplitude component while simultaneously sending higher rate data via pulse position modulation (PPM). This high rate VPPM waveform is Nyquist sampled by a high frame rate camera, using region-of-interest subsampling, to extract the high rate data. This higher rate VPPM data transmission from an LED light source is asynchronous with respect to the receiving camera. That is, the data rate timing clocks are close in frequency but they are not frequency synchronous. As is typical of asynchronous communication of this type (e.g., RS-232), the beginning of a data packet is distinguished by a start frame delimiter (SFD) which is used to establish quasi-stationary timing for the duration of the relatively short data packet.

To identify modulated lights, the duty cycle is periodically changed in the waveform to induce an AM envelope at a frequency higher than the response of the human eye. The waveform is then sampled by a camera which produces an alias frequency that produces noticeable blinking. The desired camera frame rate in relationship to the modulation bit rate is only approximately correct. SFD is conventionally used to synchronize the camera and the composite waveform. However, there is a frequency offset between the camera and composite waveform timing clocks in long packet transmission even after synchronization through SFD. There is a need for a detection algorithm with timing clock offset tracking.

BRIEF DESCRIPTION OF THE DRAWINGS

These and other embodiments of the disclosure will be discussed with reference to the following exemplary and non-limiting illustrations, in which like elements are numbered similarly, and where:

FIG. 19 illustrates an embodiment of camera-induced intersymbol interference.

FIGS. 22($a$)-($c$) illustrate frequency offset between camera frame rate and bit rate.

FIG. 23 shows possible combinations of data bits and tracking decisions according to one embodiment of the disclosure.

DETAILED DESCRIPTION

Various embodiments are generally directed to an apparatus, system, and method for improved optical wireless communication techniques. Various embodiments enable more efficient optical wireless communication between signal transmitters, such as light emitting diodes, and a signal receiver, such as a camera, by using a composite waveform. Various embodiments enable a first component of the composite waveform to indicate a second component of the composite waveform is modulated with data. Various embodiments enable the first component of the composite waveform to be decoded by a signal receiver operating at a low frequency (e.g. 1-1,000 Hz). Various embodiments enable the second component of the composite waveform to be decoded by a signal receiver operating at a high frequency (e.g. 1-1,000 kHz).

In some embodiments, the first component of the composite waveform may include a lower frequency time varying amplitude component to enable quick identification of signal sources modulated with data. In various embodiments, the second component of the composite waveform may include a higher frequency pulse position modulated component to enable high rate data communication. In various such embodiments, the higher frequency pulse position modulated component may use variable pulse position modulation (VPPM) to vary the duty cycle of pulses to generate the lower frequency time varying amplitude component.

Various embodiments of the protocols described herein may be used in conjunction with random access networks, networks that operate in unlicensed bands, and/or networks that operate in accordance with one or more standards, such as the Institute of Electrical and Electronics Engineers (IEEE) 802.11, 802.15, and/or 802.11ay standards.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1A:
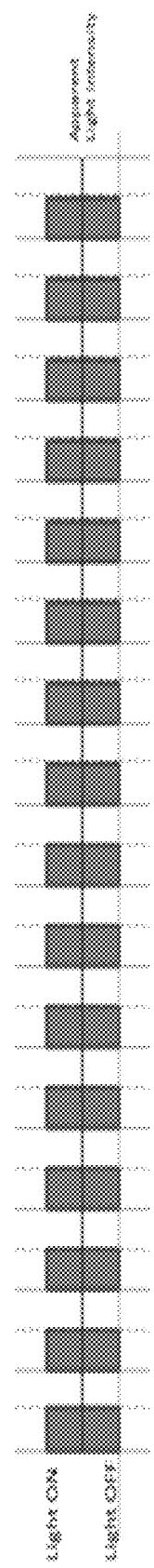
FIGS. 1A-B illustrates exemplary waveforms utilized by an optical wireless communication system.
Figure 1B:
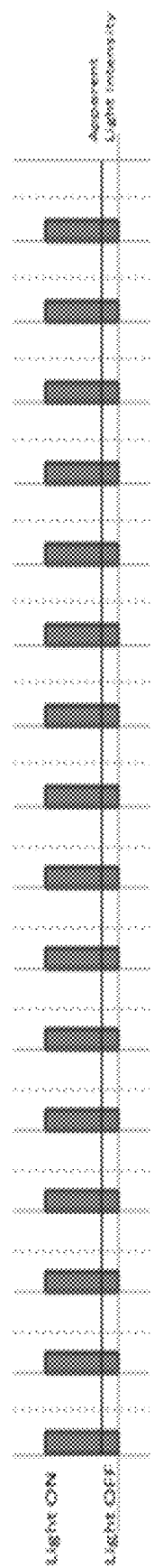

FIG. 1A illustrates an example of a waveform transmitted by an optical wireless communication system. In optical wireless communication, a signal source that generates visible light, such as an LED, may be pulsed ON and OFF to send data. The pulsing may be at a rate that can be seen or not be seen by a human being. When the pulsation frequency of the light exceeds the flicker perception frequency of the human eye, the person sees only the average light intensity of the signal source. As can be seen in FIG. 1B, if the duty cycle of pulsation, at a frequency that exceeds the flicker perception frequency, is changed then the signal source appears to proportionally change average intensity.

Figure 2A:
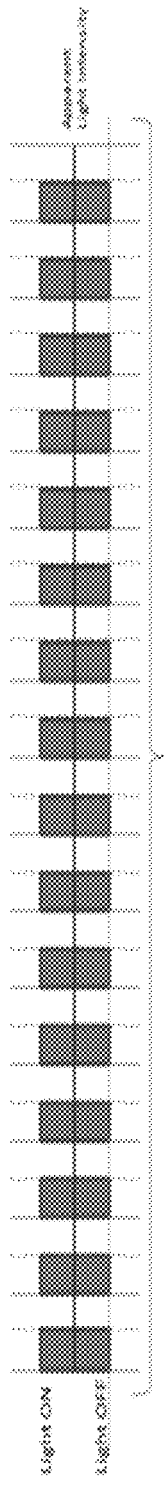
FIGS. 2A-C illustrate exemplary waveforms in conjunction with cameras, an example of a waveform received by an optical wireless communication system.

FIG. 2A illustrates an example of a waveform received by an optical wireless communication system. When viewed by a signal receiver, such as a camera, instead of the human eye, the same principle can apply, and may be controlled by the setting of the camera exposer integration time. When the exposure time is long then the camera may only respond to low frequency flicker. However, when the exposer time is sufficiently short then the camera may respond to the individual high rate pulses. This technique may enable use of a composite waveform. The composite waveform may include first and second components. The first component may identify whether or not the second component is modulated with data. This may increase the efficiency of optical wireless communication systems.

When processing a complete frame of pixels, a camera generally has a relatively low frame rate (e.g., ~30 frames per second (FPS)) which sets the Nyquist sampling rate for the camera operating in this mode. The low frame rate can decode the first component of the composite waveform. However, by processing a subset of the pixels, called the region-of-interest (ROI), the camera may significantly increase the frame rate such that the resulting Nyquist sampling rate is high enough to be able to individually decode the second component of the composite waveform. In some embodiments, the second component includes high rate data pulses.

Figure 2B:
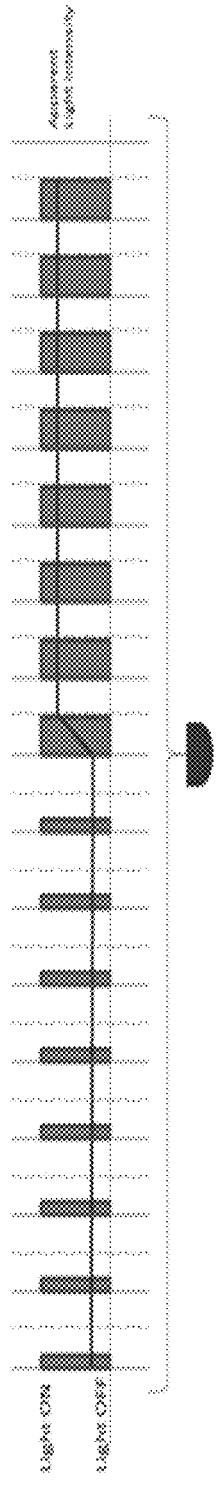

Referring to FIG. 2B, two cameras may observe the pulsating light. A first camera may have a quick exposer such that it can decode the high rate pulsing. A second camera may have a slow exposer time such that it only perceives a light with a constant intensity.

When the high rate pulse duty cycle is varied in a period manner, at a sufficiently low frequency, then the first camera may still only detect the high rate pulses, while the second camera may detect that the light has a time variant intensity at the lower frequency.

Figure 2C:
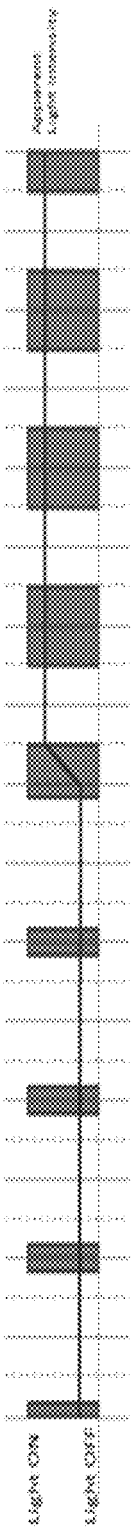

With reference to FIG. 2C, the high rate pulses may use a form of pulse position modulation (PPM) called variable PPM to encode data while accommodating pulse width modulation (PWM). In some embodiments, this may utilize Manchester encoding.

When a pulse occurs in the first half of a bit time (e.g. light ON), then that may be encoded as one logic level. When the pulse occurs in the second half of a bit time then that may be encoded as the other logic level. In some embodiments, the pulse width may not be relevant when compared to the pulse position within the bit time.

Accordingly, in some embodiments, a camera with a sufficiently long exposure time (or human eye) may see a light that is flickering at a lower frequency. Yet a camera with a sufficiently short exposure time, along with knowledge of bit timing, may ascertain the position of the pulse within the bit time slot. In various embodiments, the optical wireless communication system may then make a bit decision therefrom.

Figure 3:
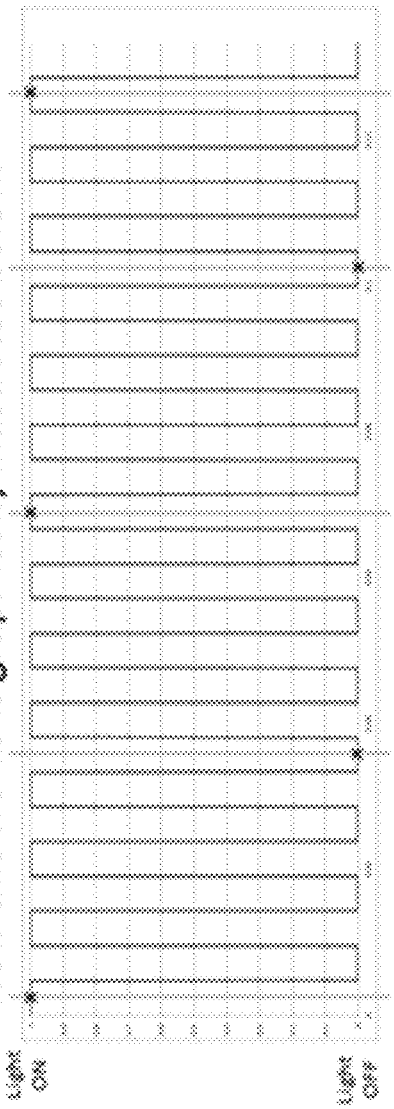
FIG. 3 illustrates an embodiment of a waveform utilized by an optical wireless communication system.

With reference to FIG. 3, in some embodiments, the frequency of the PWM induced amplitude waveform may be adjusted to either be visible by both a human and slow exposure. In other embodiments, the waveform may be adjusted to only be visible by the camera. In other such embodiments, the PWM induced flicker may be set at a frequency slightly above that observable by a human being. For example, if the PWM induced flicker is at a frequency of 10 Hz, then both a human and a camera may see the flicker. However, when the flicker frequency is at a frequency of 105 Hz, then a human could not see the flicker while the camera may still detect the flicker through a process called sub-sampling aliasing.

For example, using a 30-fps camera, with a sufficiently short exposure setting that can detect the 105 Hz flicker, the 105 Hz is aliased to 15 Hz by the following equation:

$$105-3*30=105-90=15 \text{ Hertz}$$

Figure 4A:
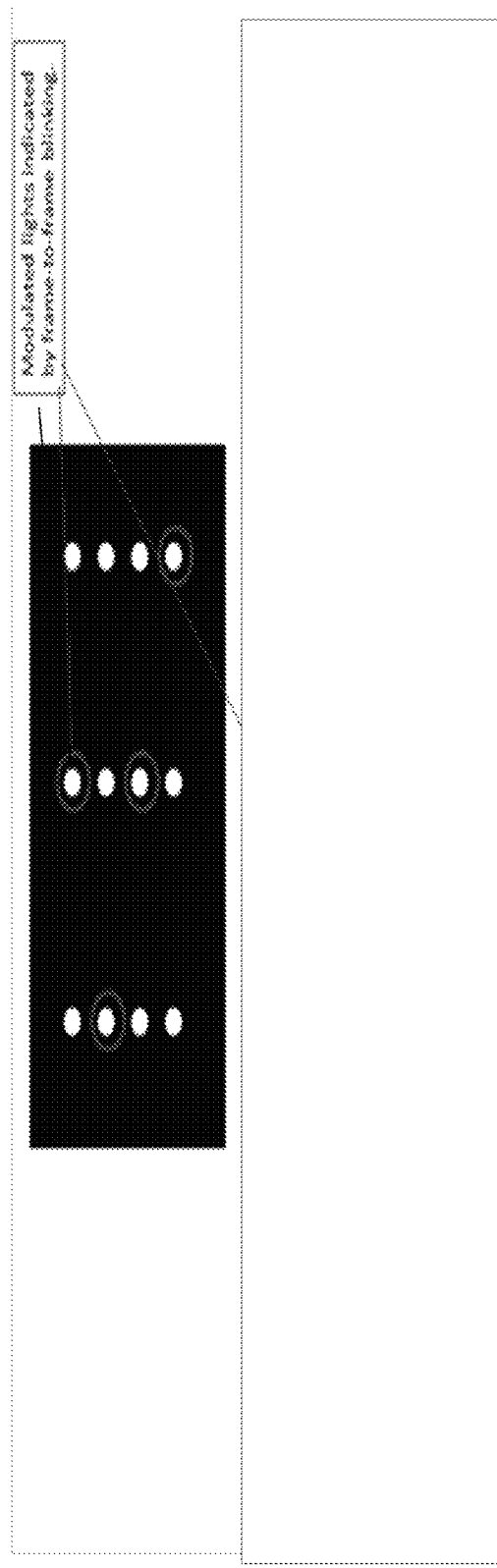
FIGS. 4A-B illustrate an example of modulated lights indicated by frame-to-frame blinking such as may be representative of various embodiments.
Figure 4B:
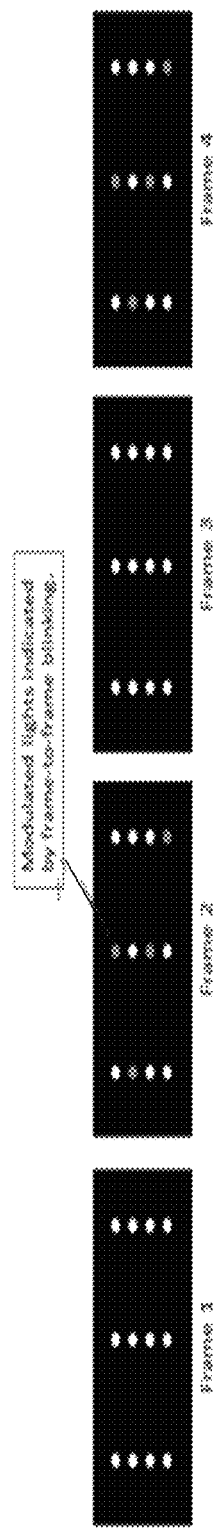

FIGS. 4A-B illustrates an example of modulated lights indicated by frame-to-frame blinking such as may be representative of various embodiments. The ability to identify modulated lights in an image is crucial to the deployment of camera technology that may leverage region-of-interest sub-sampling for demodulating modulated lights because it may be only after the ROI has been determined that sub-sampling may begin.

The techniques described herein may enable a full-frame camera to record a short video of a scene and then ascertain which lights are modulated by observing which lights appear to be blinking. ROI sub-sampling may then be performed on the blinking lights.

The apparent blinking, as seen by the camera, may either be due to a blinking frequency that is slower than the camera frame rate, or it may be due to sub-sampling aliasing produced by the camera of a light that blinks faster than the human flicker perception frequency.

The composite waveform, as described above, includes two parts. In some embodiments, the first part may include a lower frequency time varying amplitude component that, when subsampled by a low frame rate camera, results in alias induced flicker (i.e. blinking, twinkle). In various embodiments, the flicker may be useful for quickly identifying which light sources are modulated with data. In some embodiments, the second part may include a high data rate portion using VPPM that may vary the duty cycle of the pulses to generate the lower frequency time varying amplitude component while simultaneously sending high rate data via PPM. This high rate VPPM waveform may be Nyquist sampled by a high frame rate camera, using ROI subsampling, to extract the high rate data. This higher rate VPPM data transmission from a light source, such as an LED, may be asynchronous with respect to the receiving camera; that is, the data rate timing clocks may be close in frequency, but they are not frequency synchronous.

The beginning of a data packet may be distinguished by a start frame delimiter (SFD), which may be used to establish quasi-stationary timing for the duration of the relatively short data packet. As described herein, the SFD may satisfy the demands of the composite waveform by initiating the proper decoding of the higher rate VPPM data packets while supporting the lower frequency amplitude envelope twinkle.

Figure 5:
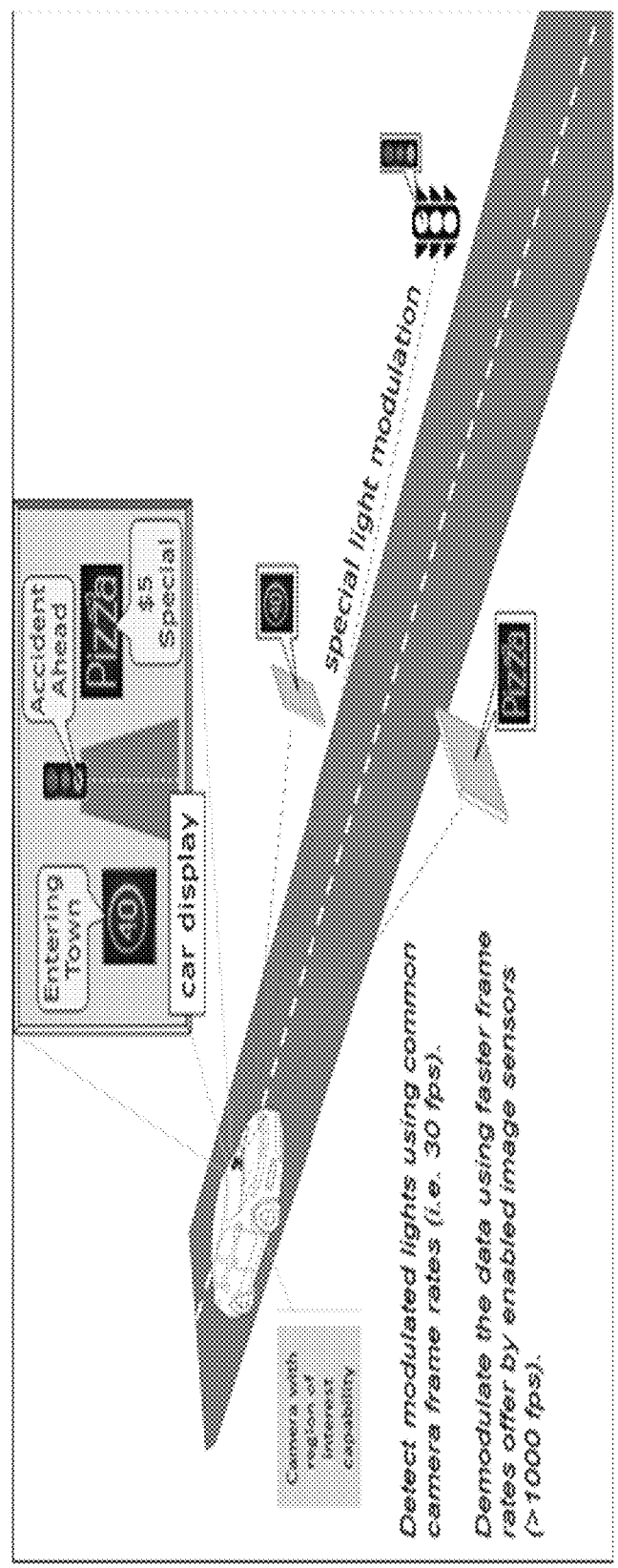
FIG. 5 illustrates an exemplary embodiment of an optical wireless communication system.

FIG. 5 illustrates an exemplary embodiment of an optical wireless communication system. A camera may be mounted on a vehicle to view down the road. Along the side of the road there may be LED signage with each sign being modulated with a special waveform, called a "composite waveform", which may simultaneously send data and a frequency tone. The frequency tone is used to indicate to the camera which LED signage in the field of view is modulated with data. The camera needs to know which LED signs are transmitting data because the camera will sequentially scan each LED sign, using a reduced pixel count "region of interest" mode, to extract the data message at a high frame rate scan.

Figure 6:
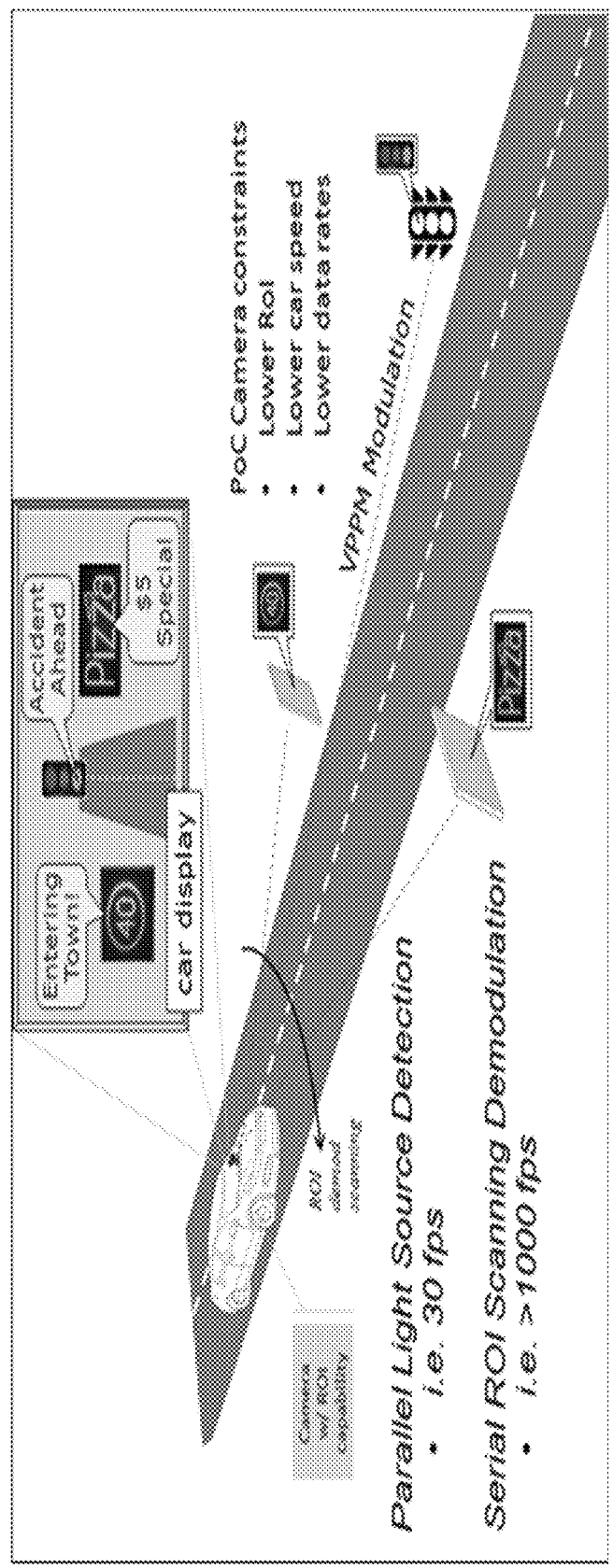
FIG. 6 illustrates an exemplary scanning process utilized by an optical wireless communication system.

FIG. 6 provides more detail on the scanning process. The detail shows that in some embodiments the car's camera is initially viewing the scene at a frame rate of 30 fps to identify which LED signs are modulated with data, and then scans each sign at a much higher frame rate (e.g. 10 kfps) over a reduce pixel region-of-interest image area.

Figure 7:
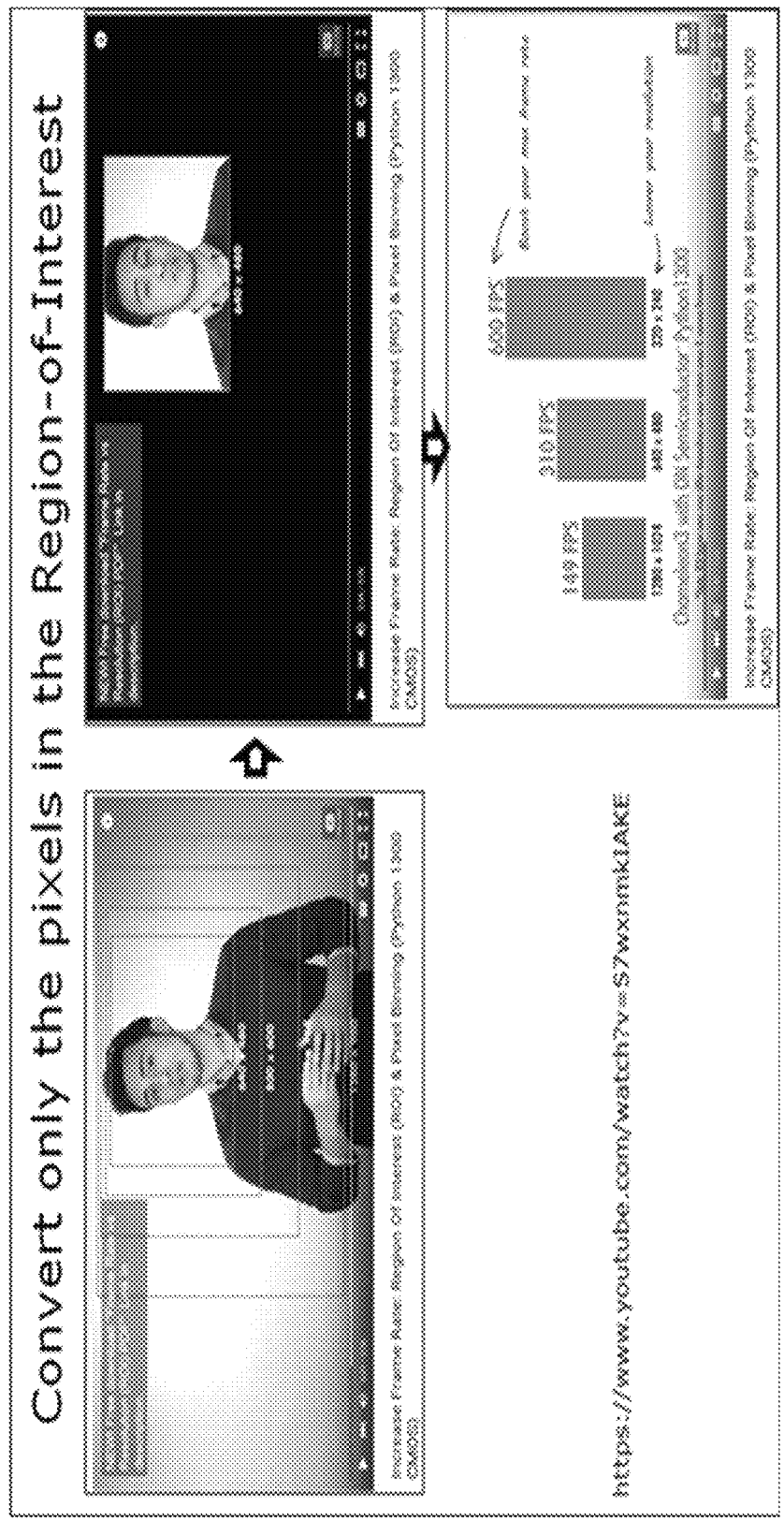
FIG. 7 illustrates an exemplary embodiment of ROI scanning.

FIG. 7 demonstrates an exemplary embodiment of ROI scanning. The image in the left portion of FIG. 7 shows an embodiment of the full pixel image. The image in the right portion of FIG. 7 shows a reduced pixel count "region-of-interest" image. As the image conversion time may be proportional to the number of pixels, the reduced image on the right takes less time to convert than the image on the left; thus, the frame rate can be significantly higher, thereby improving performance of the system.

Figure 8:
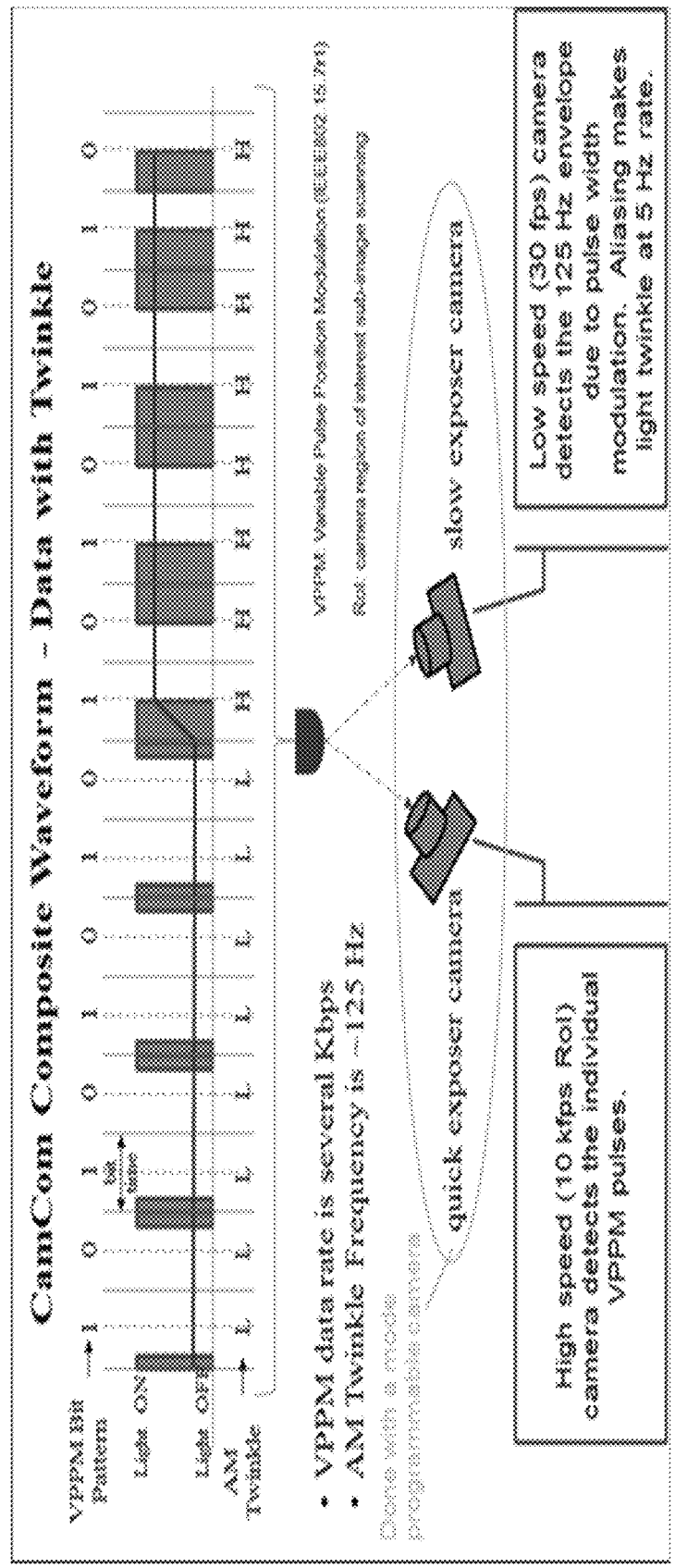
FIG. 8 illustrates an exemplary embodiment of a composite waveform that may be utilized by the optical wireless communication system of FIG. 5.

FIG. 8 illustrates an exemplary embodiment of a composite waveform that may be utilized by the optical wireless communication system of FIG. 5. The composite waveform may include two parts: (i) a VPPM component which may transmit higher rate data bits, and (ii) a lower frequency component which may be generated by time varying the duty cycle of the PPM pulses. The lower frequency induced waveform may be used to indicate an LED sign is modulated with data. In some embodiments both parts are detected by adjusting the exposure settings of a single camera. In other embodiments, each part is detected by a separate camera.

Figure 9:
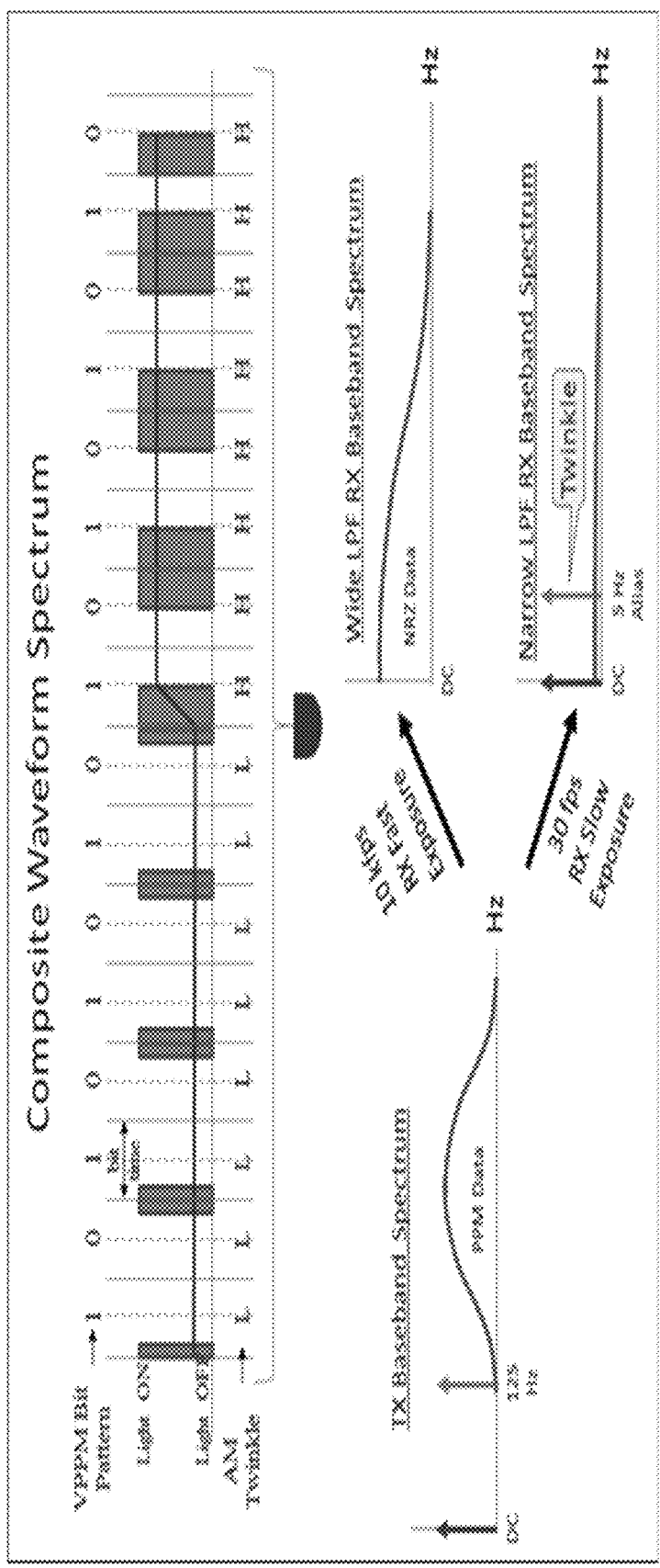
FIG. 9 illustrates a spectrum of the composite waveform to further illustrate the duality of the signals.
Figure 10:
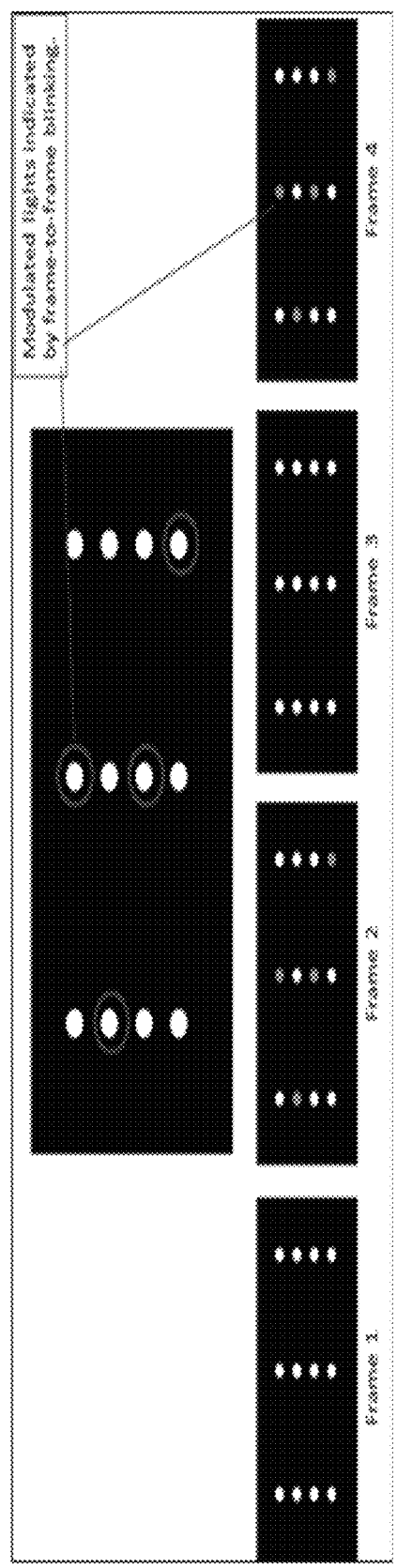
FIG. 10 illustrates modulated lights indicated by frame-to-frame blinking.

FIG. 9 illustrates a spectrum of the composite waveform to further illustrate the duality of the signals. The lower right corner of FIG. 9 shows the spectral aliasing that may be associated with under sampling the exemplary 125 Hz tone with an exemplary 30 fps camera. In some embodiments, this may be accomplished with under sample frequency shift ON OFF keying, as described in detail below. The result is the fact that this exemplary 125 Hz tone translates to a lower exemplary frequency of 5 Hz signal when sampled at 30 fps. The 5 Hz alias tone may manifest itself as 5 Hz ON-OFF keying which makes the LED light source of interest appear to twinkle. This is shown in FIG. 10 when captured as frames from a short video.

Figure 11:
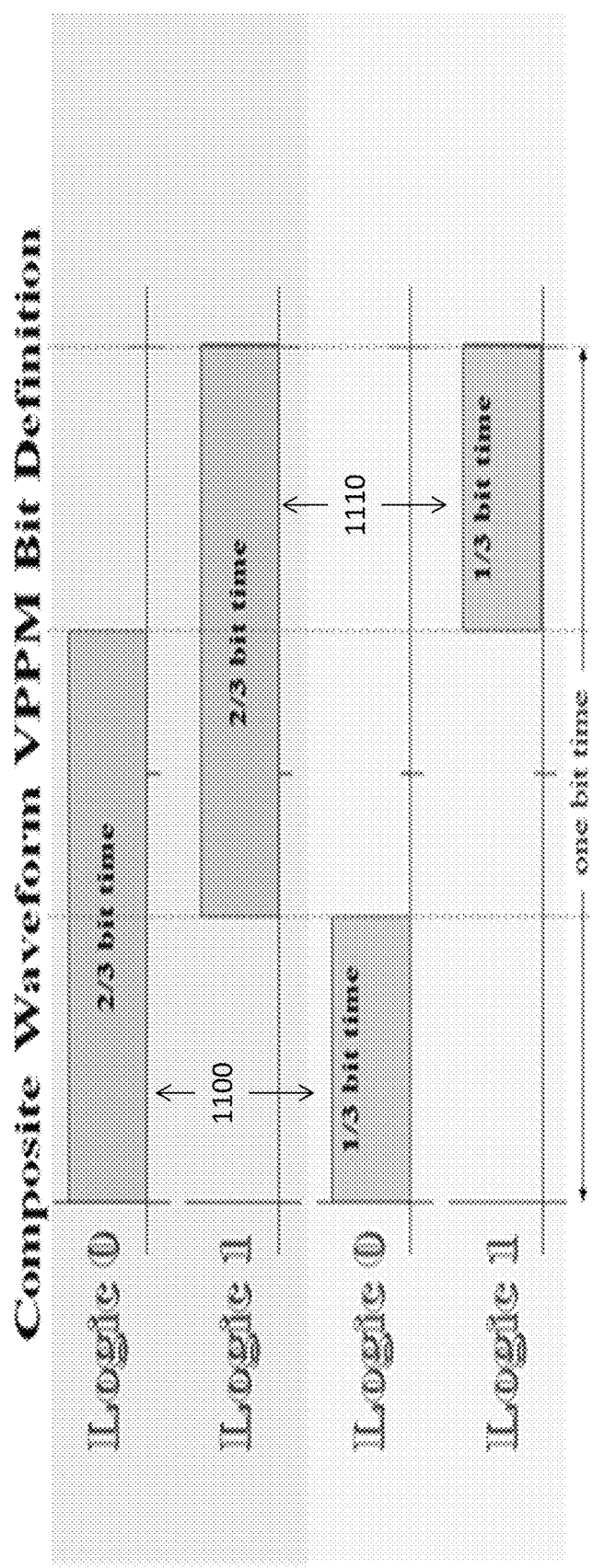
FIG. 11 illustrates an example of VPPM bit definitions.

FIG. 11 illustrates an exemplary VPPM bit definitions that may generate the amplitude modulation. Notice that logic "0" and "1" can come in two versions: 2/3 and 1/3 duty cycle. One difference is the position of the pulse within the bit period and the width of the pulse. Again, the position of the pulse within the bit period may differentiate between a logic "0" and a logic "1". In some embodiments, this choice of pulse widths may allow the generation of the AM envelope while using a minimum transmitter bit rate clock oversample rate of 3. Referring to FIG. 11, there are four waveforms represented in the time duration of one bit (i.e., one bit time). If the pulse is on the left side of the bit time (1100) then a logic 0 is being sent. If the pulse is on the right side of the bit time (1110) then a logic 1 is being sent. The pulse width is either 2/3 of a bit time or 1/3 of a bit time depending upon the need to generate the AM envelope signal The pulses shown in FIG. 11 can intensity modulate an LED light by turning on and off the light. The pulsating light may be observed by a camera operating at a video frame rate that provides 4 video frames per PPM bit period (i.e., camera frame rate is four times the VPPM bit rate). Thus, FIG. 11 shows logics 0 and 1 for each of the 2/3 bit time (interchangeably, bit period) and for 1/3 bit period.

Figure 12:
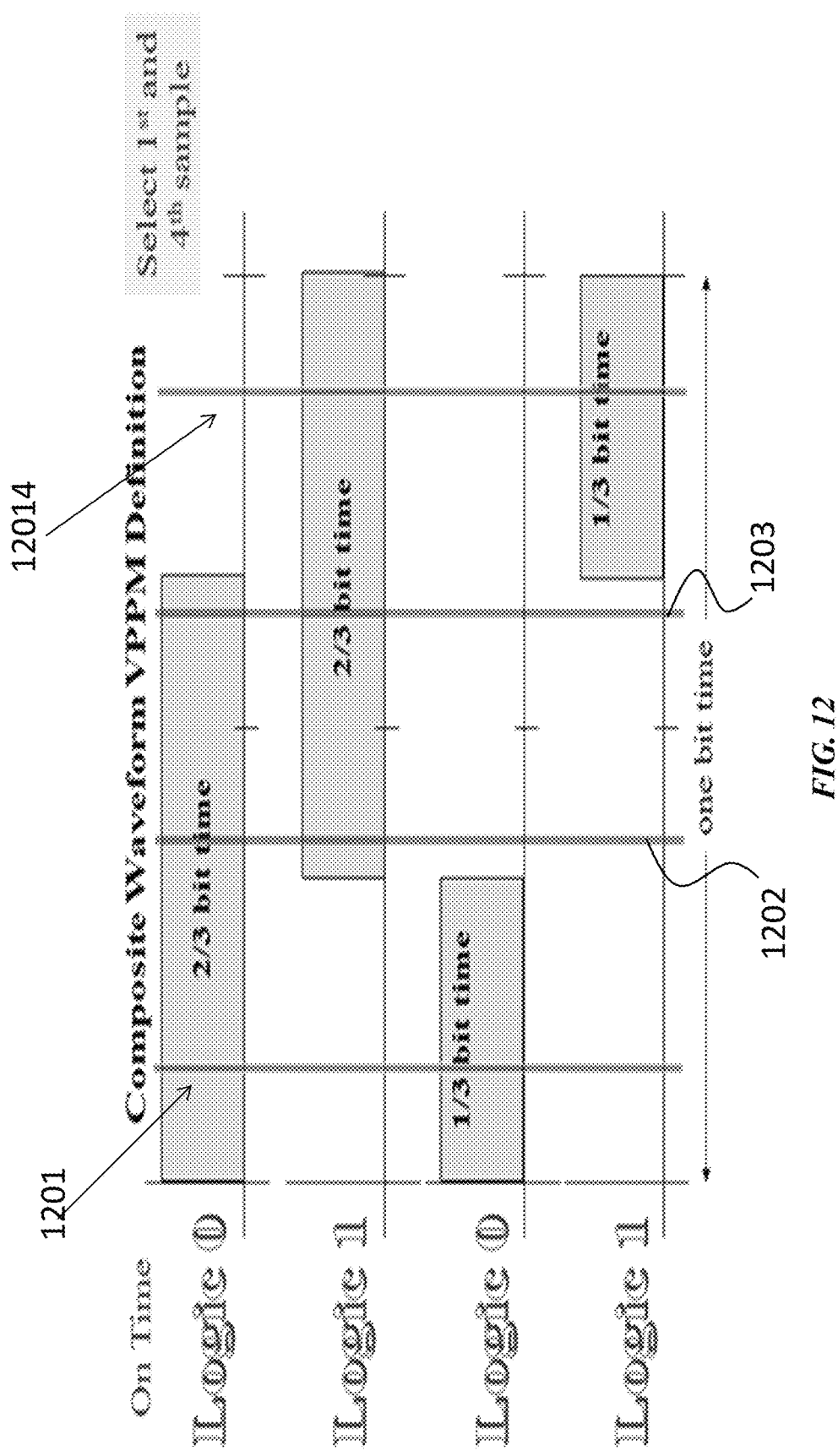
FIGS. 12-15 illustrate exemplary VPPM pulse patterns.

FIG. 12 illustrates one possible sample phase of the camera as it records the state of the PPM modulated LED light. Here, the first 1201 and the fourth 1204 data samplings are selected to represent transmitted optical data. FIG. 12 demonstrates that for the four shown camera sample times, only the first 1201 and fourth 1204 samples will allow correct decoding of the PPM data in this embodiment. The proper signal processing for this camera sample phase would be to keep the first 1201 and fourth 1204 sample and discard the second 1202 and third 1203 samples; however, this rule only applies to the particular application of FIG. 12.

Figure 13:
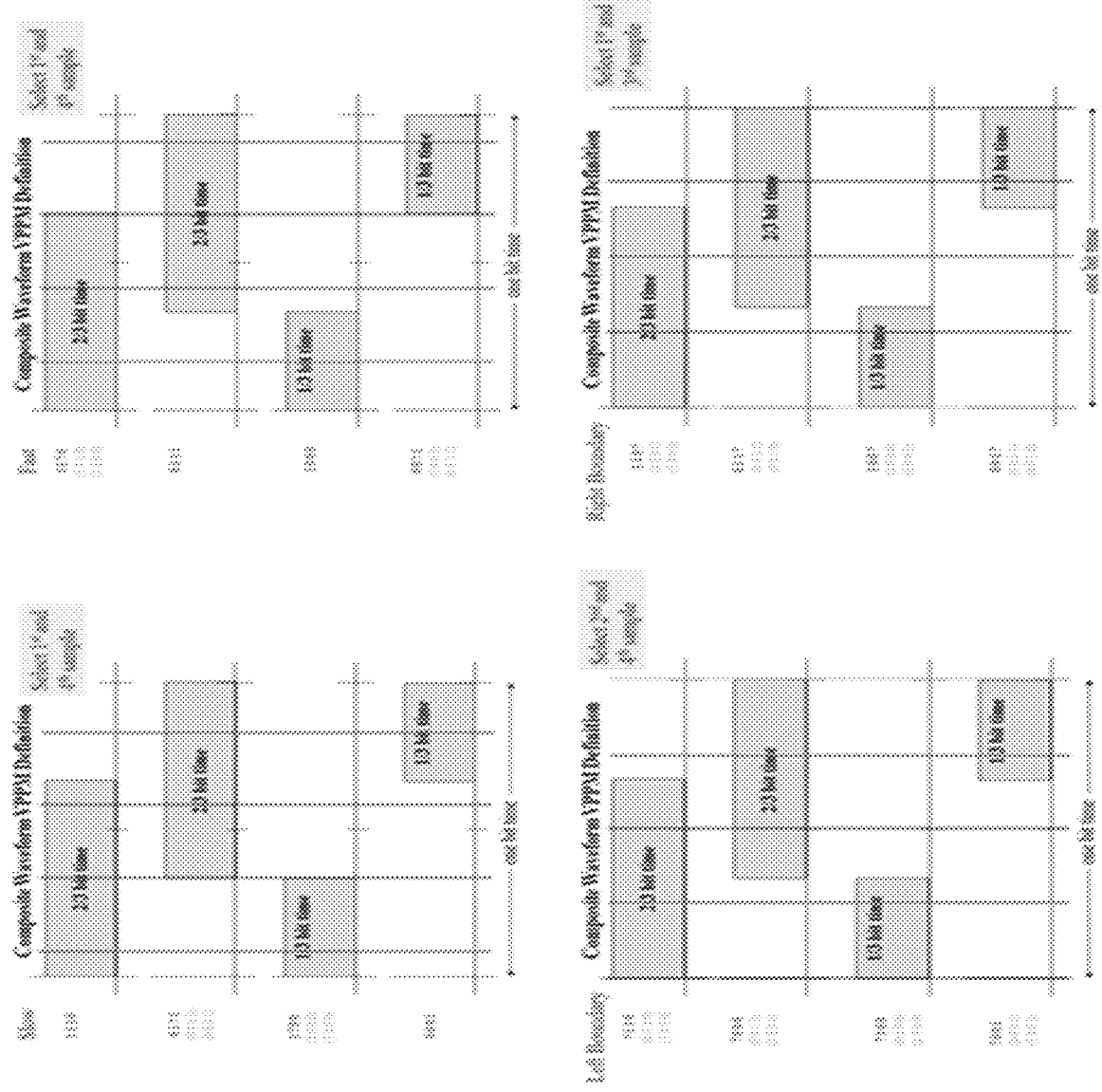

FIG. 13 illustrates some alternative camera sample phases. Specifically, FIG. 13 shows the same set of VPPM pulse patterns as FIG. 12 but with four different camera sample phases. These phases are 'slow', 'fast', 'left boundary' and 'right boundary'. Notice that the top two camera sample phases would also select the first and fourth samples for PPM bit decoding, but the bottom two camera sample phases would select the second and fourth and the first and third sample phases respectively.

In certain disclosed embodiments, the PPM signal processing circuitry determines which sample phases to keep and which sample phases to discard. This may be accomplished with the information provided by the SFD which is described further in reference to FIG. 16.

Figure 14:
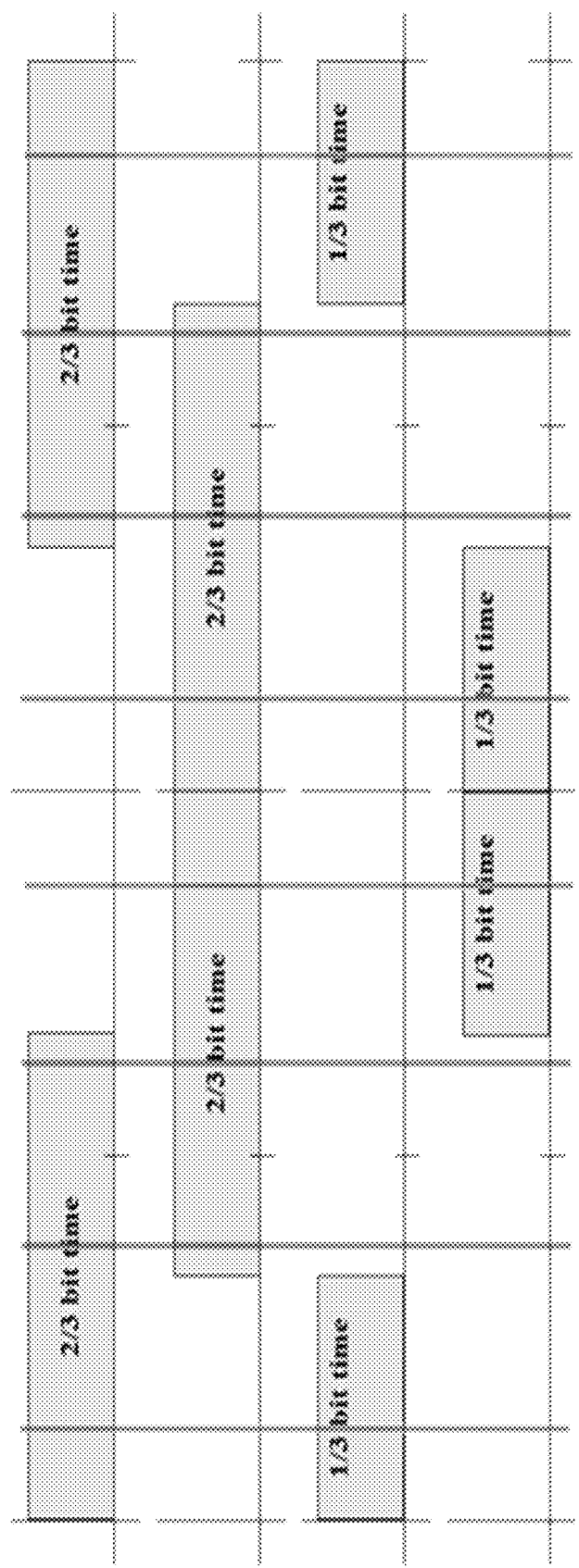
Figure 15:
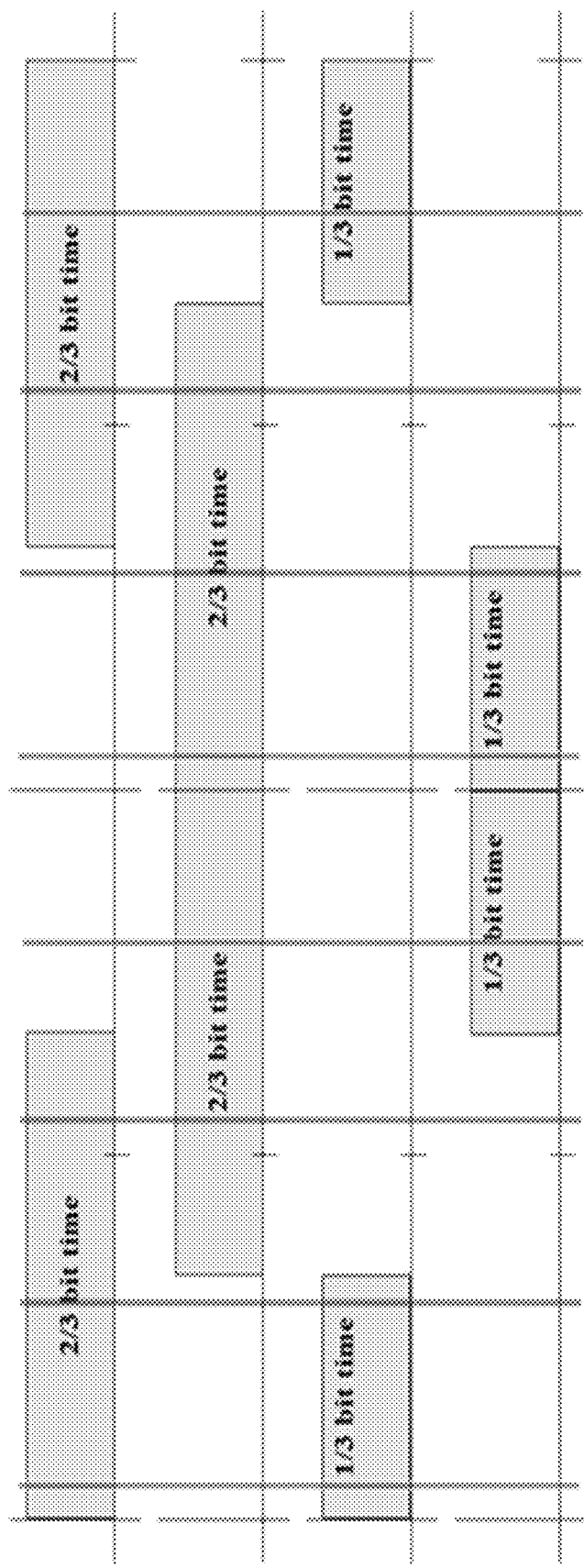

The following is a description of the maximum run length for a normal VPPM symbol according to one embodiment of the disclosure. FIG. 14 shows possible sampled VPPM pulse sequences for bit patterns '01' and '10' according to various disclosed embodiments. It is evident that the consecutive sample run length without a level transition is six (either six 6 ones in a row or 6 zeros in a row). FIG. 15 shows that for an extreme sample phase, the run length reduces to 5 but it never exceeds 6 consecutive sample values without a level transition.

Figure 16:
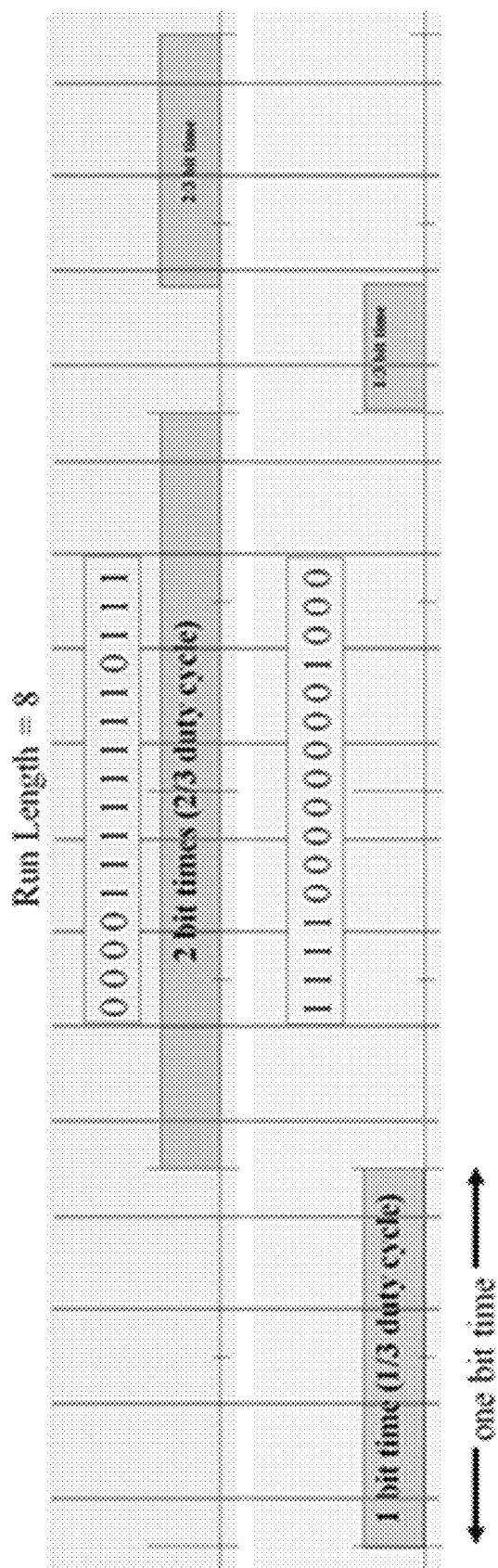
FIG. 16 illustrates an exemplary SFD definition.

FIG. 16 illustrates an exemplary embodiment of the SFD according to certain embodiments. The SFD may be used to determine the beginning of the data packet and thus indicate where the camera starts sampling. The SFD is also used to initialize the tracking algorithm at $bit_{N-1}$. As shown in FIG. 16, the SFD can be 4 bit periods long and may support both 2/3 and 1/3 duty cycle. In one embodiment, the SFD may include two parts: a three-bit period long 'illegal character' start flag followed by a 'logic symbol' (i.e., logic one for the 2/3 duty cycle and logic zero for the 1/3 duty cycle). The first part of the SFD, the start flag, may be called an 'illegal character' because, as previously shown for VPPM, there would never be a run length of 8 for a legal character set. Accordingly, when a run length of 8 is observed then it can be determined that the start flag is 'coming through'. In an exemplary implementation, the last bit period in the SFD, the logic symbol, may be used to determine the down-sampling phase; that is, which samples to keep and which sample to discard.

Figure 17:
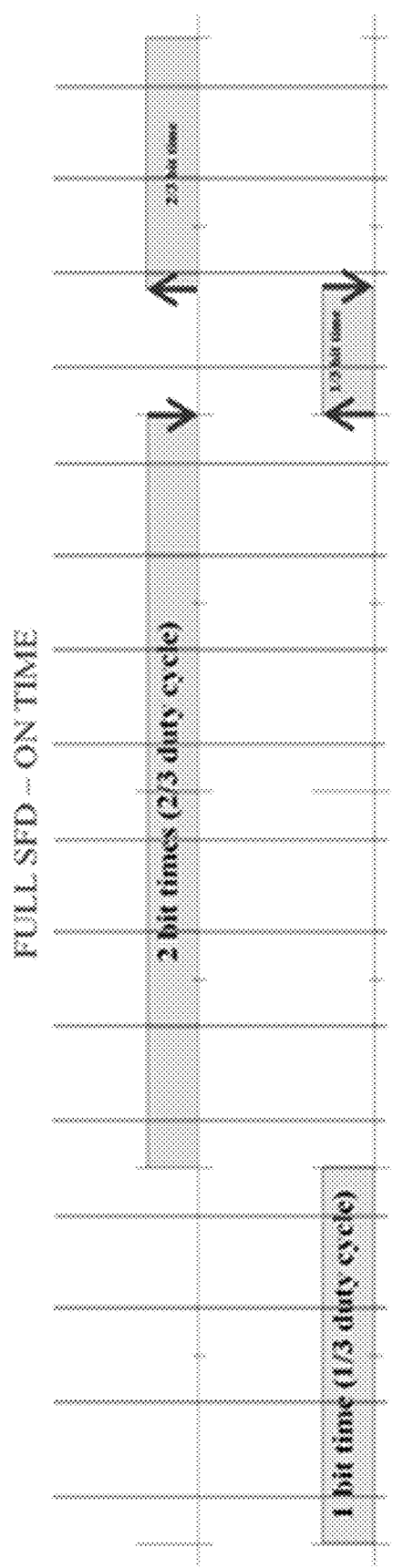
FIG. 17 illustrates an example of forced SFD transitions.

FIG. 17 illustrates an example of forced logic level transitions with respect to the SFD. These logic transitions, which occur on bit boundaries, may be used to measure the inter-symbol-interference (ISI). In some embodiments, ISI defines how quickly the light—as seen by the camera—transitions from one logic level to the other. This may be required to determine which of the four sample phases to select when decoding the pulse position modulation into bits.

Figure 18:
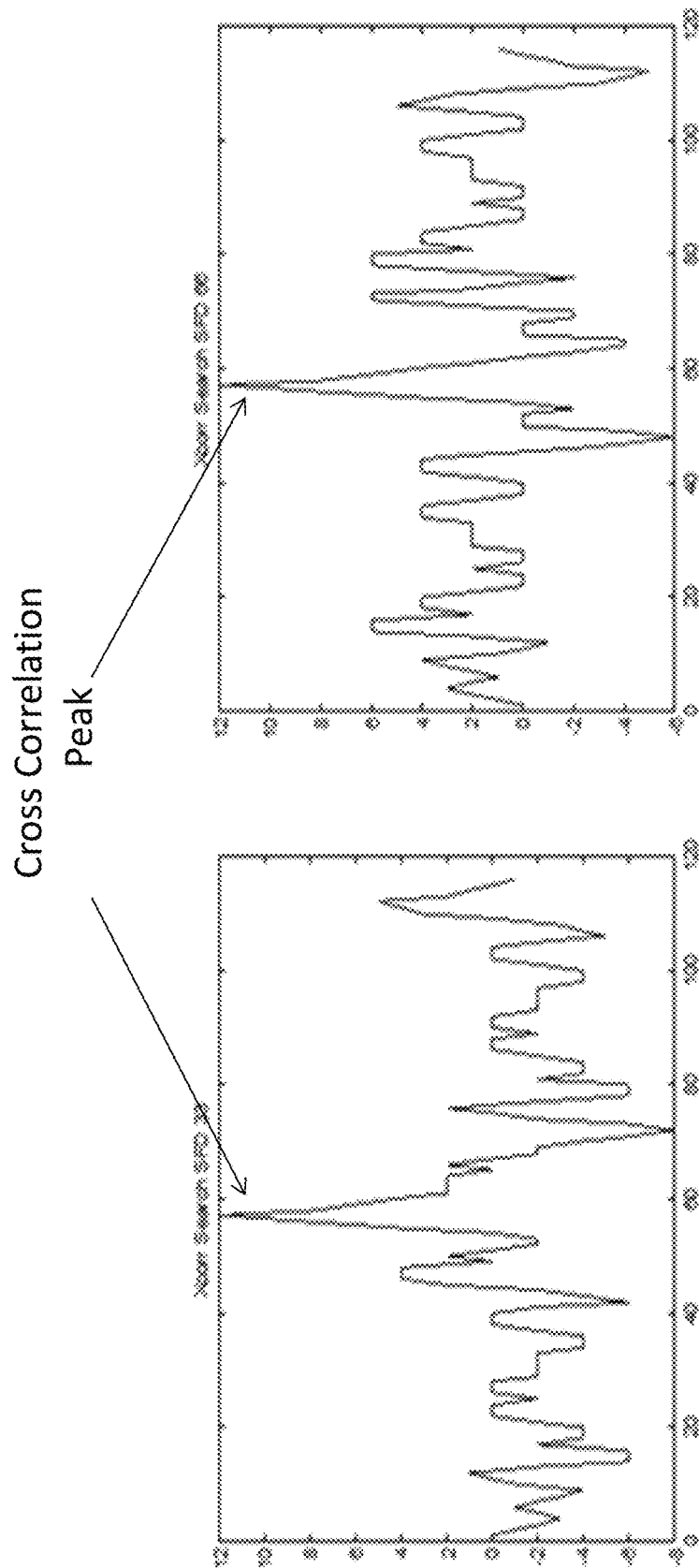
FIG. 18 illustrates an example of the cross-correlation performance with the SFD mask embedded in a random data sequence.

FIG. 18 illustrates an example of the cross-correlation performance with the SFD mask embedded in a random data sequence. The cross-correlation peak is clearly observable in the illustrated embodiment. As will be appreciated by one of skill in the art, the peak can be extracted by several different methods.

Camera integration time induced ISI will now be described in more detail. Cameras include a pixel integration time, perhaps more commonly called the exposure time, which may be the time duration that the pixel is exposed to the light source. When the camera exposure time overlaps a logic level transition then the result is ISI. This makes the 'bit pattern' have sloped edges instead of sharp transitions as shown in FIG. 19. In FIG. 19 the camera exposure is ¼ of a Bit Time. Avoiding the Use of Camera samples that occur near transition edges can reduce or eliminate this ISI as discussed below. In some embodiments, with four samples per bit, down-sample phases that are not near symbol boundaries may be selected.

Figure 20:
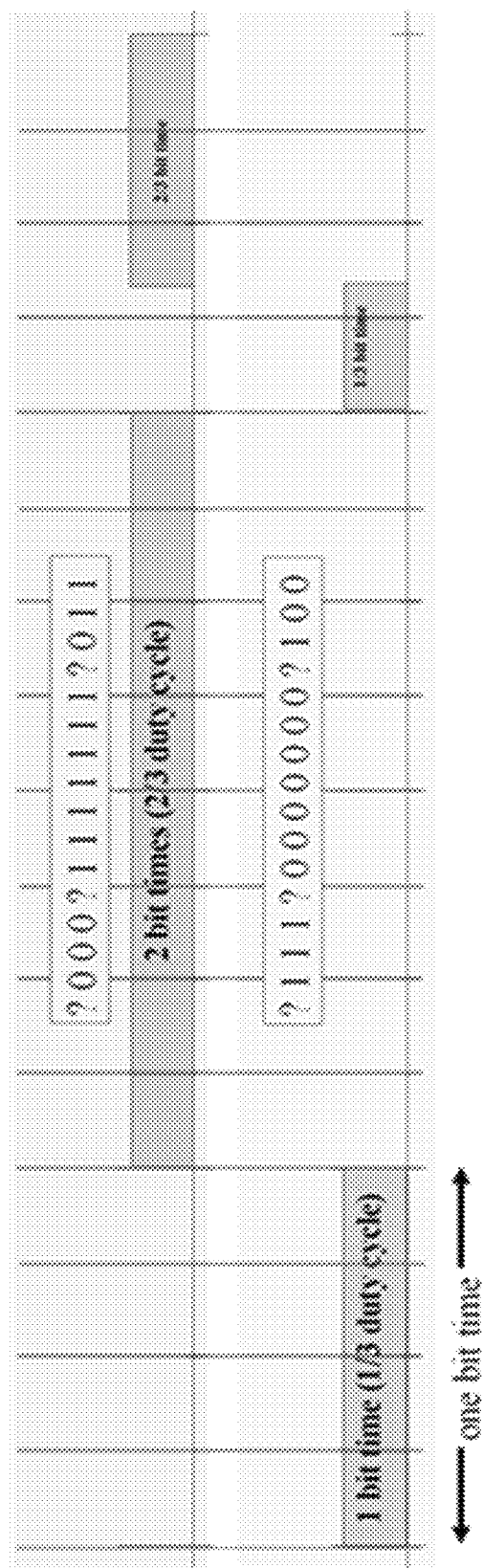
FIG. 20 illustrates an exemplary sample phase.
Figure 21:
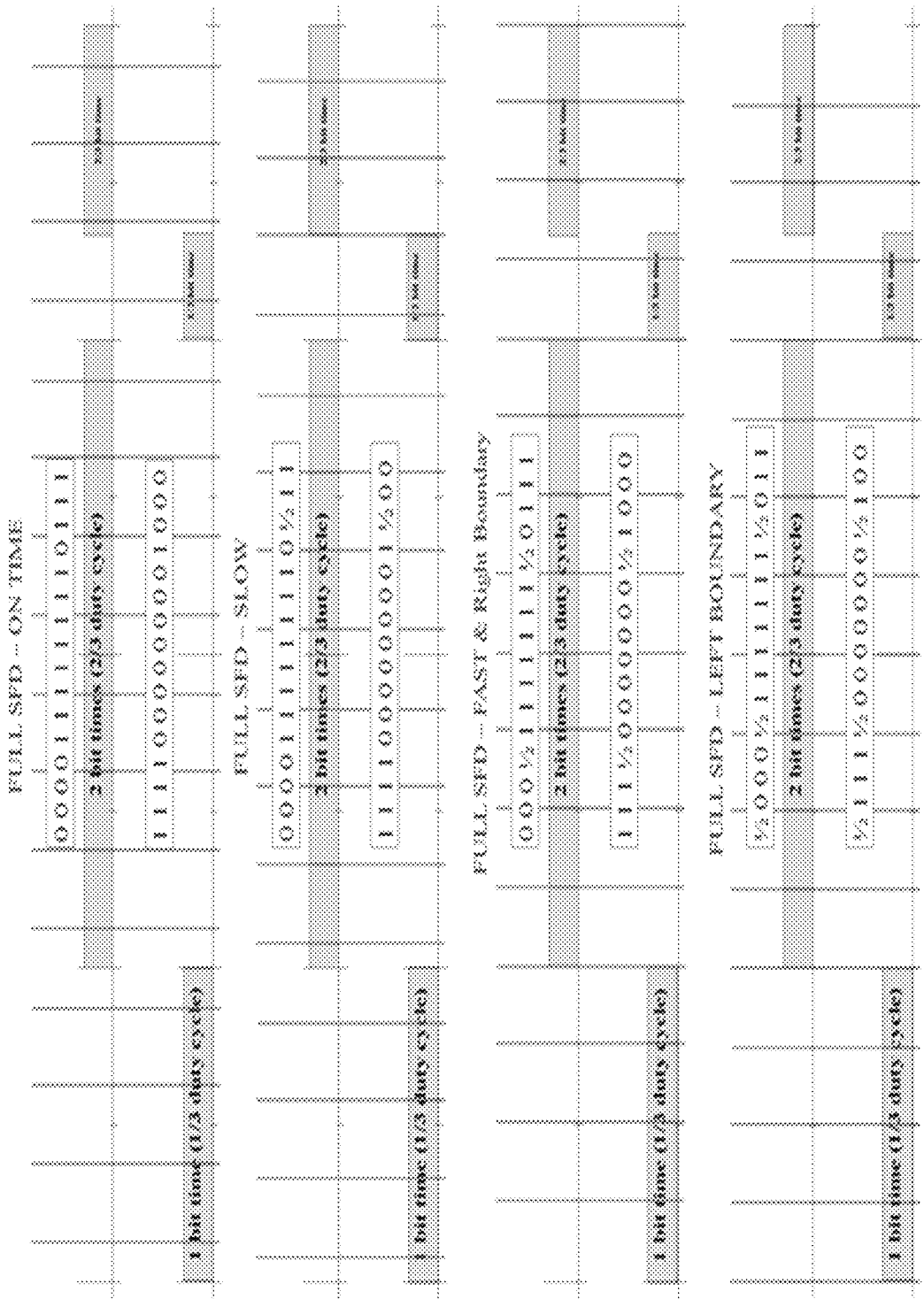
FIG. 21 illustrates other exemplary sample phases.

FIG. 20 shows that even for an extreme exemplary sample phase the run length may never be less than seven (7). In the illustrated embodiment, where indeterminate samples that fall on boundaries are shown as question marks. Referring to FIG. 20, it can be seen that a case where the camera sampled the SFD on a transition boundary resulting in an ambiguous sample value that is somewhere between a high value and a low value due to ISI. But even for the contrived case of FIG. 20, the run length is not less than 7 and could be as large as 9. FIG. 21 illustrates some possible sample phases and the resulting bit patterns from which the down-sampling decision rules may be As stated, frequency offset develops between the camera's sampling rate ($f_c$) and the modulated LED timing clock (i.e., symbol rate ($f_s$)). For example, the camera may take four samples per symbol. Ideally, the relationship of Equation (1) holds as follows:

$$4f_c = f_s \quad (1)$$

In this context, a positive frequency offset is a condition where $4f_c \geq f_s$ and negative frequency offset is a condition where $4f_c \leq f_s$. Frequency offset is particularly pronounced during transmission of long packets after the SFD. In certain embodiments, the disclosure provides detection algorithms and apparatus with timing clock offset tracking capabilities using the composite waveform. In one implementation, the sampling patterns generated by a composite waveform during one bit period are studied. Different composite waveform duty cycles and timing clock offsets may be used to generate a set of possible sample patterns. The sampling patterns of the composite waveform may be compared with the generated set of sample patterns to make tracking decisions.

FIGS. 22(a)-(C) illustrate frequency offset between camera frame rate and bit rate. Specifically, FIGS. 22(a)-(C) are exemplary representation of sampling of $bit_N$ with positive frequency offset (i.e., fast tracking). Here, the samples associated with $N^{th}$ bit period (i.e., $N^{th}$ VPPM symbol) are numbered $S_0$, $S_{-1}$, $S_{-2}$, $S_{-3}$, $S_{-4}$ and $S_{-5}$. $S_0$ is the newest camera sample and $S_{-5}$ is the oldest camera sample. Three bits are also shown as $bit_{N-1}$, $bit_N$ and $bit_{N+1}$. Each bit is sampled four times. For example, in FIG. 22(a), $bit_N$ is sampled at $S_0$, $S_{-1}$, $S_{-2}$, $S_{-3}$. By observing the temporal relationship between bit sampling $S_0$ and the start of $bit_N$ in each of FIGS. 22(a)-(c), the presence of positive frequency offset can be readily seen. For example, at FIG. 22(b), the temporal location of bit sampling $S_0$ relative to $bit_N$ shows a temporal lag. The temporal lag is further exaggerated in FIG. 22(c) where bit sampling $S_0$ occurs almost at the end of the bit amplitude value 1 of $bit_N$. For simplicity, this type of frequency offset where sampling rate is slower than the symbol rate is called positive frequency offset. That is, the samples tend to slide to the left of the chart. To address positive frequency offset, the camera sampling rate should be compensated.

Conversely, negative frequency offset occurs when camera sampling rate is faster than the bit rate or bit symbol rate. To address negative frequency offset, the camera sampling rate should be compensated differently than in the positive frequency offset. Conditions in which the bit rate and the symbol rate remain consonant are neutral and the camera sampling need not be changed.

FIG. 23 shows possible combinations of data bits and tracking decisions according to one embodiment of the disclosure. Specifically, FIG. 23 shows all possible combination of data bits ($bit_{N-1}$, $bit_N$ and $bit_{N+1}$) and a related decision to address frequency offset according to one embodiment of the disclosure. In one embodiment of the disclosure, bit samplings are compared with the data show in Tables A and B of FIG. 23 and a hard tracking decision is made as to the frequency offset. Different compensation is used depending on whether the frequency offset is determined as positive (fast) or negative (slow).

In certain embodiments, the disclosure addresses positive or negative frequency offset by considering the most recent four sampling bits as well as the immediately preceding bit to render a current bit decision. The samples associated with any one bit are received $S_{-3}$, $S_{-2}$, $S_{-1}$ and $S_0$, where $S_0$ is the newest camera sample and $S_{-3}$ is the oldest camera sample. For example, if the most current samples ($S_{-3}$, $S_{-2}$, $S_{-1}$ and $S_0$) are 0001, the previous bit was 0 and the current bit is 1, then the camera and symbol rate are tracking and no further action is necessary (i.e., there is no camera1 offset). This condition is shown in the second row of Table A.

On the other hand, if the four current samples ($S_{-3}$, $S_{-2}$, $S_{-1}$ and $S_0$) are 0010, the previous bit was 1 and the current bit is 1 (as show in the third row of Table B), then camera tracking action is slow. Here, the current last sample is kept and three new samples are taken during the next symbol. This makes a total of 4 samples altogether which are then used according to the hard decisions and tracking tables of FIG. 23.

As another example, if the four current samples ($S_{-3}$, $S_{-2}$, $S_{-1}$ and $S_0$) are 0100, the previous bit was 0 and the current bit is 0 (as show in the fifth row of Table A), then camera tracking action is fast. Here, five new samples are taken during the next symbol and the first is discarded.

In Tables A and B, the rows that are grey-filled are considered illegal symbol samples and no action may be taken. Also, row 7 of Table A and row 10 of Table B show conditions where two possible outcomes may result depending on the state of current bit selection. As will be shown in greater detail below, an algorithm may be devised to consider all possible sampling and tracking decisions.

Tables A and B of FIG. 23 are obtained by considering all possible combination of data bits ($bit_{N-1}$, $bit_N$ and $bit_{N+1}$) and its associated VPPM symbols, where $bit_N$ is the most current bit decision. Assuming $bit_{N+1}$ is correctly detected and the value of $bit_{N+1}$ is unknown, Tables A and B consider all possible camera patterns generated during $bit_N$ period.

It should be noted that in the disclosed embodiments, the amplitudes have been normalized to have values of 0 or 1. In certain implementations, the sample values may be extracted from an eight-bit analog to digital converter (ADC) and may have corresponding amplitude values. To obtain the normalized levels 0 and 1, the received samples are thresholded. In an exemplary embodiment, the threshold value can be ascertained using the SFD histogram. The sample combinations may be affected by the $(N+1)^{th}$ bit and both cases $bit_{N+1}=0$ and $bit_{N+1}=1$ have to be considered.

As discussed in relation to FIGS. 22(a)-22(c), positive frequency offset causes the sample to slide to the left relative to the symbol time. Thus, the camera sample sequences ($S_{-3}$, $S_{-2}$, $S_{-1}$, $S_0$)=(0,0,1,1), (0,0,0,1) and (1,0,0,1) may be obtained for cases of FIGS. 22(a), (b) and (c), respectively. The association of each of these sequences with $bit_{N-1}=1$ provides enough information to decode the sampled bit as 1. In addition, in case of FIG. 22(c), sample $S_{-3}$ allows for detection of positive offset and its correction.

Referring again to FIG. 23, once the appropriate row of Tables A or B is identified, a tracking action can be made on the basis of whether there is a frequency offset. For example, if tracking action indicates slow, then the algorithm is instructed to go to next symbol, keep current last sample and ingest 3 new samples.

Figure 24:
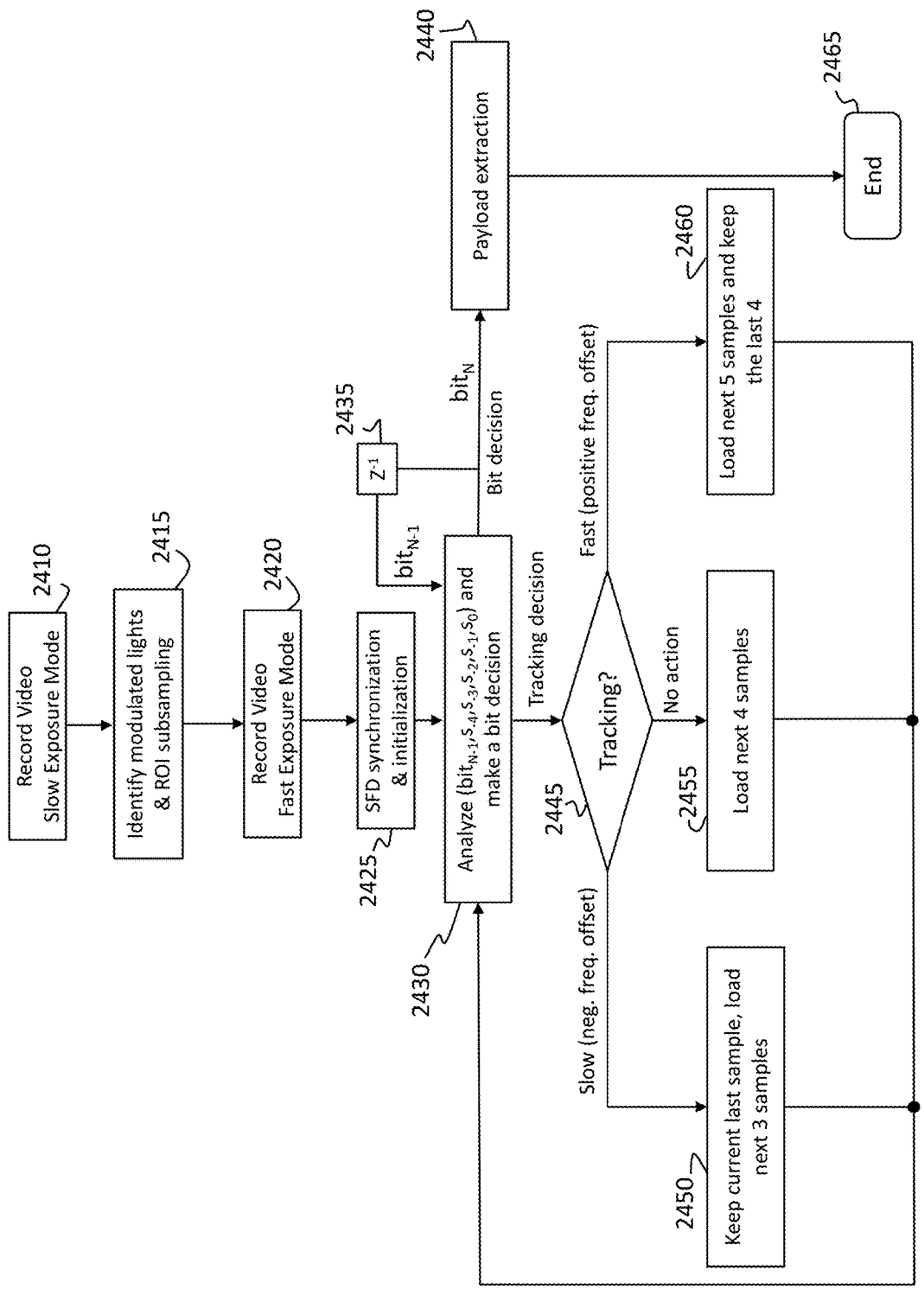
FIG. 24 is a flowchart to represent an implementation according to one embodiment of the disclosure.

FIG. 24 is a flowchart representing an exemplary implementation according to one embodiment of the disclosure. The process starts at step 2410 when the incoming light (e.g., LED from a sign) is recorded as video in slow exposure mode. The video may be recorded at a local memory associated with device. In one embodiment of the disclosure, the recorded video is stored on the cloud. At step 2415, the recorded video is reviewed to identify one or more ROI. As discussed in relation to FIGS. 4 and 10, the ROI may be identified as pixels which are twinkling (e.g., having amplitude change). At step 2420, the recorded video is played back at fast exposure mode. In certain embodiments, slow and fast exposure times are directly related to camera recording modes. Slow exposure time is associated with a camera recording at slow frame rate (i.e., 30 fps at full resolution). This recording mode is used to find modulated lights. Once lights have been identified, the recorded slow exposure time video may be discarded. In fast exposure mode, new videos are recorded, which now may be using ROI with much higher fps (e.g., 1,000 fps using 100×100 pixels ROI). A video may be recorded per detected modulated light source. These videos may be used to extract data from modulated light sources. Recording of multiple videos related to multiple light sources may occur serially in time. For instance, if three light sources a, b and c (with corresponding ROIs) are obtained in 2415, 2420 records three videos using the fast exposure mode starting with a, followed by b and finally c. Each video stream may be processed separately for extracting data.

At step 2425, SFD synchronization begins as described above. That is, once the ROI and SFD are identified, synchronization begins. In certain embodiments, synchronization is implemented using the prior bit sampling as shown in step 2430 and as discussed in relation to Tables A and B of FIG. 23. In step 2430, camera sample sequences $S_{-4}$, $S_{-3}$, $S_{-2}$, $S_{-1}$ and $S_0$ of $bit_N$ as well as $bit_{N-1}$ are analyzed to make a bit decision. Bit decision making may be done as dead-reckoning in connection with, for example, Tables A and B of FIG. 23. FIG. 24 also shows input 2435 which is a feedback of $bit_N$ ($Z^{-1}$) at a subsequent clock cycle. The bit decision is used for payload extraction as shown in step 2440.

Step 2445-2450, 2455 and 2460 illustrate frequency offset tracking. Specifically, at step 2455 a decision is made as to whether there is negative, positive or neutral frequency offset. If negative frequency (i.e., video frame rate is too slow) is detected, at step 2450, the most current last sample is kept and three new samples are loaded. The process then reverts to step 2430 where the new samples are analyzed and a new bit decision is made.

If frequency offset is positive (i.e., video frame rate is too fast), the subsequent five samples are loaded and the last four samples are also kept. The process reverts to step 2430 where the newly loaded samples and the four older samples are used to make a bit decision.

If no frequency offset is detected, at step 2455, no action is taken and four new samples are loaded. The process reverts to step 2430 where the four new samples are used to analyze frequency offset and to make a new bit decision.

Figure 25:
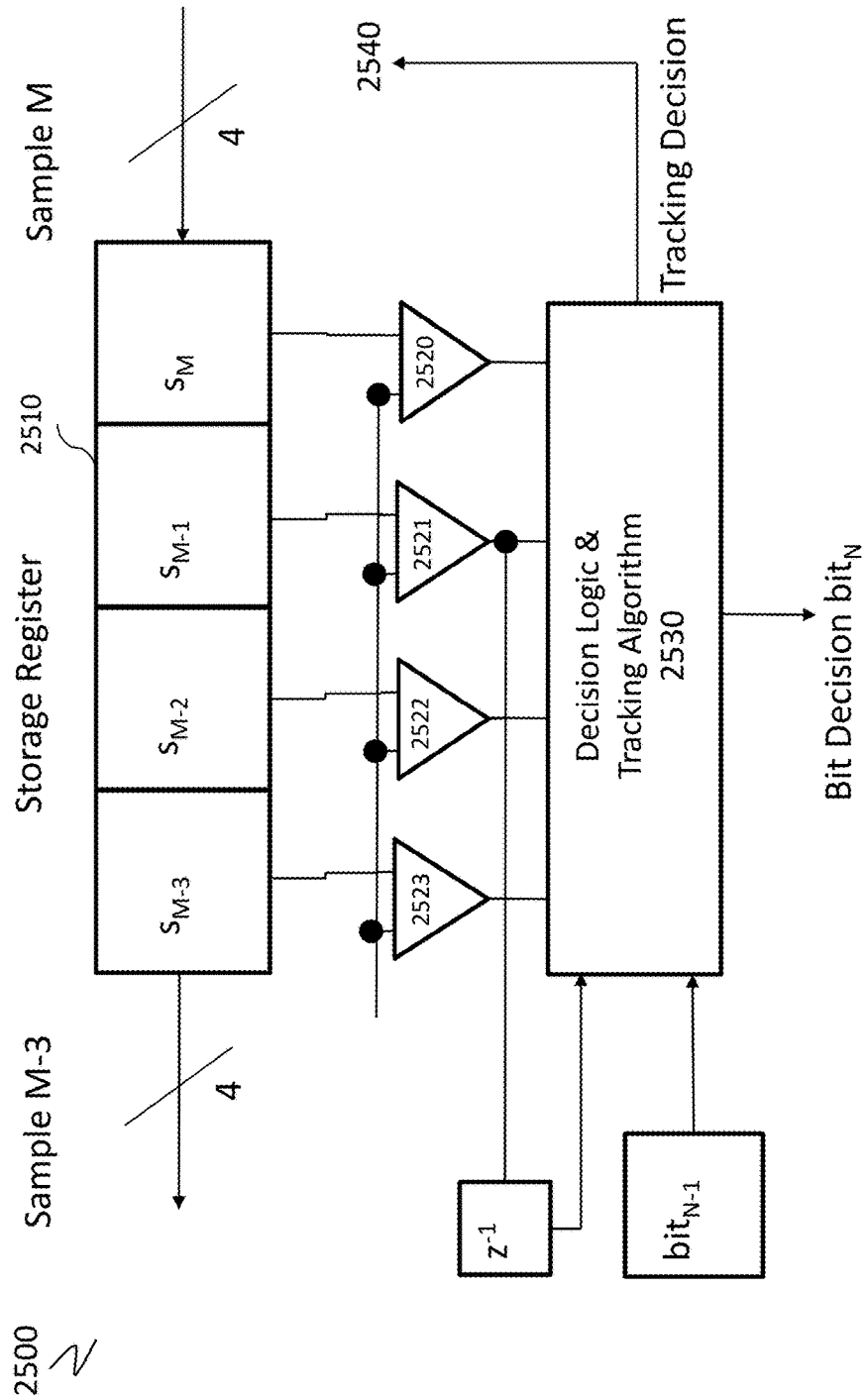
FIG. 25 is an exemplary circuitry for implementing an embodiment of the disclosure.

FIG. 25 is an exemplary circuitry for implementing an embodiment of the disclosure. The circuitry of apparatus 2500 of FIG. 25 may be implemented in hardware or a combination of hardware and software. As shown in FIG. 25, samples enter shift register 2510 which is shown with four shift register storage cells. The storage cells can store one bit per clock cycle. The storage cells are identified as $S_M$, $S_{M-1}$, $S_{M-2}$ and $S_{M-3}$ to correspond to the incoming data bit from sample M.

It should be noted that the embodiment of claim 25 is exemplary and non-limiting in nature. For brevity, shift register 2500 is shown as a four-bit shift register. In certain implementations of the disclosed principles, after a tracking decision (e.g., fast tracking, per FIG. 23) has been made, more than four samples are needed to compensate for the offset. Thus, while shift register 2510 is shown as a four-bit shift register, it should be noted that the disclosed principles are not limited thereto and may include shift register of different storage cell size (e.g., six-bit or eight-bit storage) without departing from the disclosed principles.

Comparators 2520, 2521, 2522 and 2523 are aligned to receive output from each of the corresponding shift registers $S_M$, $S_{M-1}$, $S_{M-2}$ and $S_{M-3}$, as shown. Each comparator compares the input with a so-called hard decision threshold. For example, each of the incoming bits ($S_M$, $S_{M-1}$, $S_{M-2}$ and $S_{M-3}$) are compared with the hard decision samples ($S_0$, $S_{N-1}$, $S_{N-2}$ and $S_{N-3}$) as shown in the first columns of Tables A and B of FIG. 23. The output from the comparators is fed to controller 2530.

Controller 2530 may comprise a processor circuitry and a memory circuitry. Controller 2530 may be implemented in hardware, software or a combination of hardware and software. In one embodiment, controller 2530 implements decision logic and tacking algorithm consistent with the disclosed embodiments. In addition to the current bit decision, controller 2530 also receives prior bit decision input ($Z^{-1}$) and a subsequent bit ($B_{N-1}$).

In certain embodiments, controller 2530 uses these inputs to determine a bit decision for $bit_N$. In addition, controller 2530 may identify frequency offset by implementing a tracking algorithm as disclosed herein. For example, controller 2530 may apply the exemplary algorithm disclosed in relation to FIG. 24 to identify tracking as one of positive, negative or neutral. In an exemplary embodiment, controller 2530 may compensate for a positive frequency offset determination by taking five (5) samples from the next symbol and discarding the first. In another exemplary embodiment, controller 2530 may compensate for a negative frequency offset by keeping the current sample and ingesting three (3) new samples from the next symbol. Based on these steps, controller 2530 may issue a tracking decision 2540 to keep the camera sampling rate and the bit rate on track.

Figure 26:
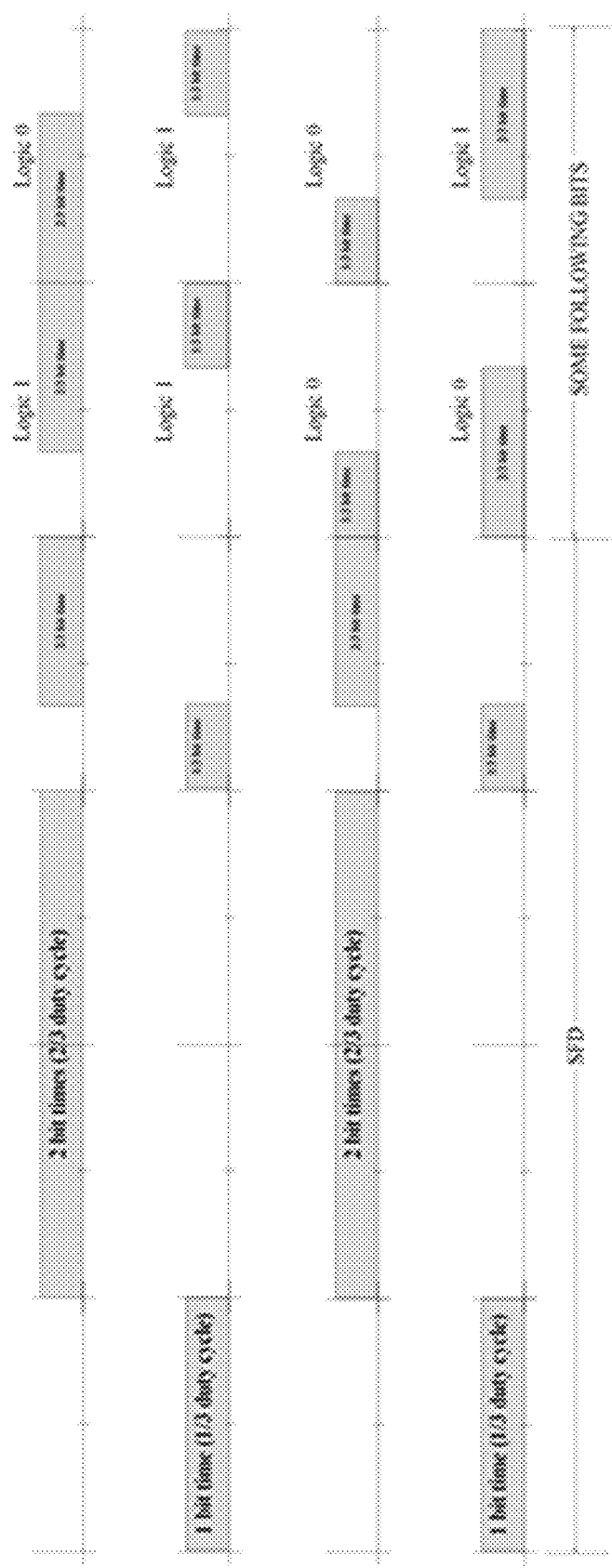
FIG. 26 illustrates a mixture of SFD types and data bit types.

FIG. 26 illustrates a mixture of SFD types and data bit types. FIG. 26 shows the two SFD types with some following bits. The first and the third lines are the 2/3 duty cycle SFD followed by bit patters 10 and 00 respectively. Likewise, the second and fourth lines show the 1/3 duty cycle SFD followed by bit patterns 11 and 01 respectively.

Figure 27:
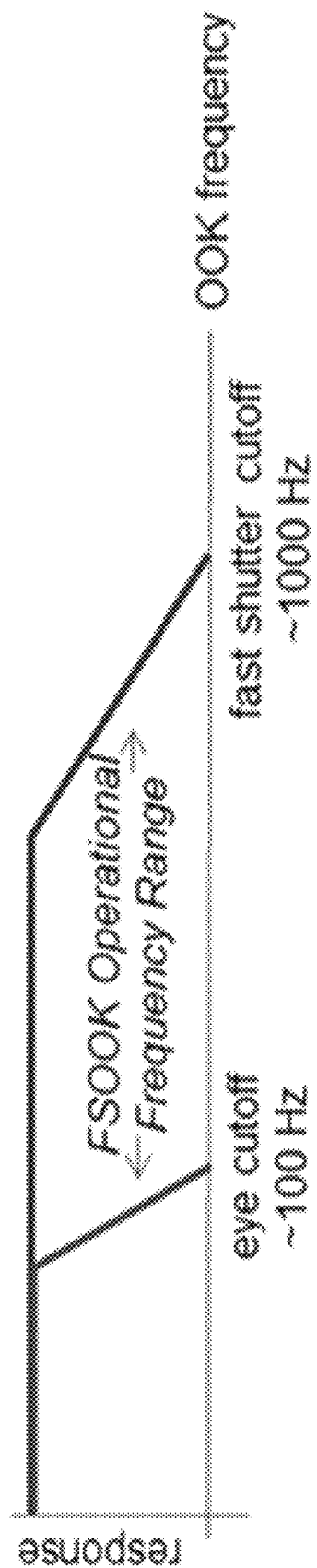
FIG. 27 illustrates an exemplary embodiment of sample frequency shift ON OFF keying.

FIG. 27 illustrates an exemplary embodiment of sample frequency shift ON OFF keying. In regards to the observability of a "blinking light", the UFOOK waveform transitions can be seen by a camera with the appropriate exposure setting, but not by the human eye, since the camera's exposure setting can be much faster than the eye as shown in FIG. 28.

The human eye has a cutoff frequency near 100 Hz, whereas the camera's cutoff response can significantly exceed 100 Hz depending upon the exposure speed setting (integration time). Under intense light conditions the exposure can be set to well under 1 ms and still result in satisfactory performance. As suspected, the techniques described herein require a relatively intense light source (i.e., high Signal-to-Noise Ratio).

Figure 28:
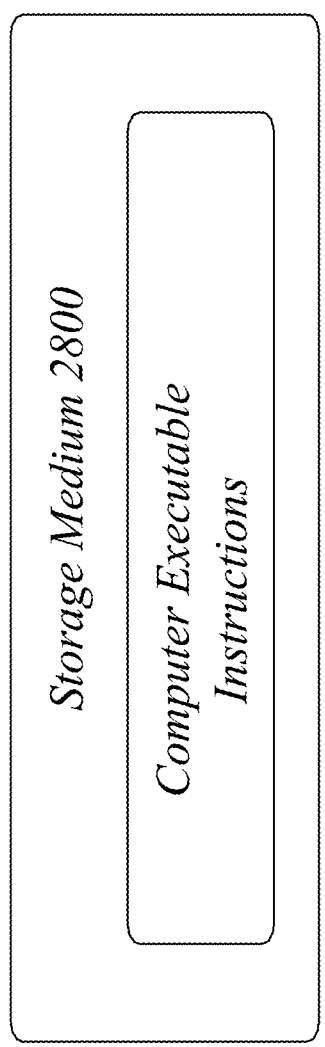
FIG. 28 illustrates an embodiment of a storage medium.

FIG. 28 illustrates an embodiment of a storage medium 2800. Storage medium 2800 may comprise any non-transitory computer-readable storage medium or machine-readable storage medium, such as an optical, magnetic or semiconductor storage medium. In various embodiments, storage medium 2800 may comprise an article of manufacture. In some embodiments, storage medium 2800 may store computer-executable instructions, such as computer-executable instructions to implement the SFD acquisition algorithm. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 29:
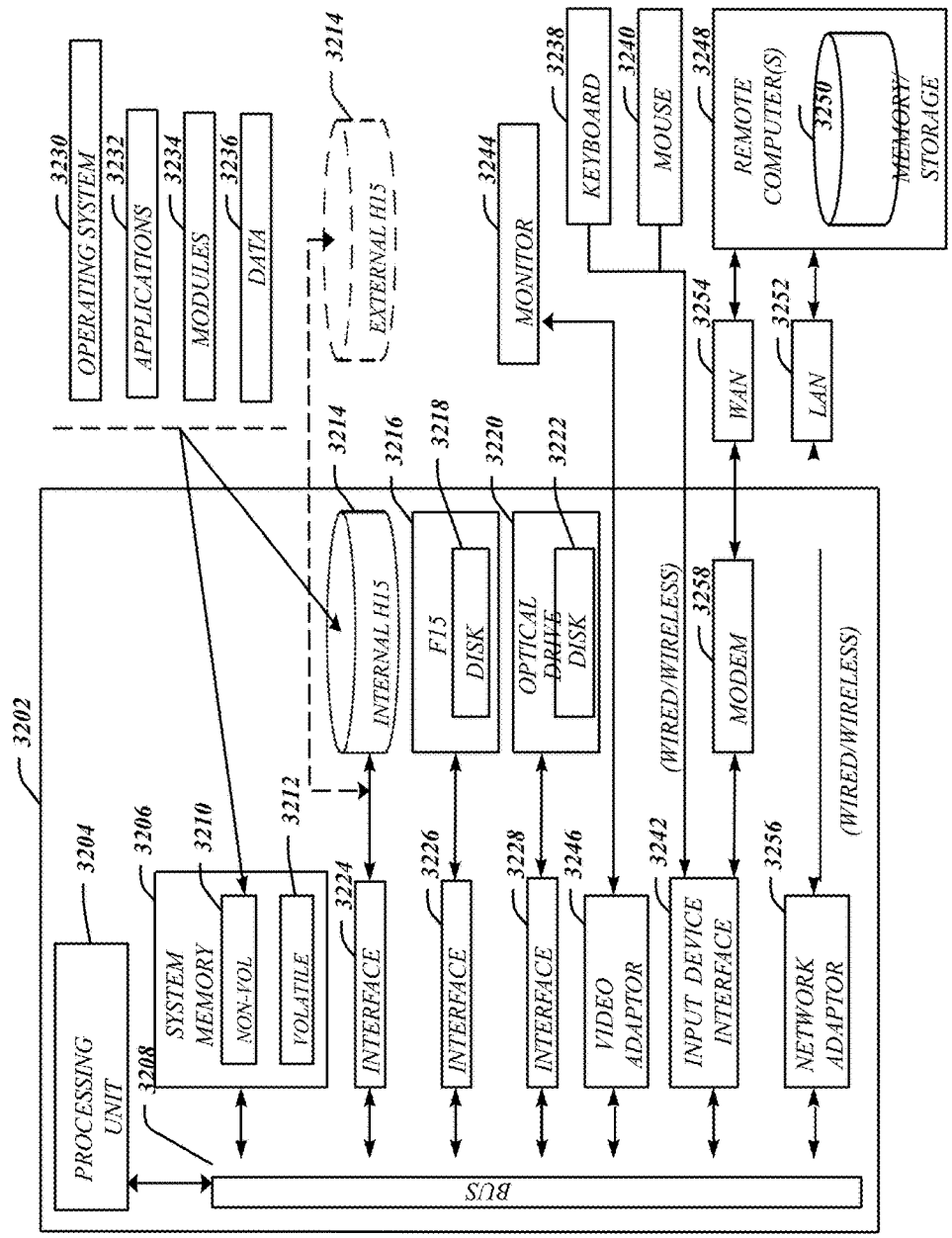
FIG. 29 illustrates an embodiment of a computing architecture.

FIG. 29 illustrates an embodiment of an exemplary computing architecture 3200 that may be suitable for implementing various embodiments as previously described. In various embodiments, the computing architecture 3200 may comprise or be implemented as part of an electronic device. In some embodiments, the computing architecture 3200 may be representative, for example, of a processor or server that implements one or more components of the optical wireless communication system. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 3200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 3200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 3200.

As shown in FIG. 29, the computing architecture 3200 comprises a processing unit 3204, a system memory 3206 and a system bus 3208. The processing unit 3204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors.

Dual microprocessors, multi-core processors, and other multi-processor architectures may also be employed as the processing unit 3204.

The system bus 3208 provides an interface for system components including, but not limited to, the system memory 3206 to the processing unit 3204. The system bus 3208 can be any of several types of bus structure that may further interconnect to a memory bus (with or without a memory controller), a peripheral bus, and a local bus using any of a variety of commercially available bus architectures. Interface adapters may connect to the system bus 3208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 3206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 32, the system memory 3206 can include non-volatile memory 3210 and/or volatile memory 3212. A basic input/output system (BIOS) can be stored in the non-volatile memory 3210.

The computer 3202 may include various types of computer-readable storage media in the form of one or more lower speed memory units, including an internal (or external) hard disk drive (HDD) 3214, a magnetic floppy disk drive (FDD) 3216 to read from or write to a removable magnetic disk 3218, and an optical disk drive 3220 to read from or write to a removable optical disk 3222 (e.g., a CD-ROM or DVD). The HDD 3214, FDD 3216 and optical disk drive 3220 can be connected to the system bus 3208 by a HDD interface 3224, an FDD interface 3226 and an optical drive interface 3228, respectively. The HDD interface 3224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 3210, 3212, including an operating system 3230, one or more application programs 3232, other program modules 3234, and program data 3236. In one embodiment, the one or more application programs 3232, other program modules 3234, and program data 3236 can include, for example, the various applications and/or components of the optical wireless communication system.

A user can enter commands and information into the computer 3202 through one or more wire/wireless input devices, for example, a keyboard 3238 and a pointing device, such as a mouse 3240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 3204 through an input device interface 3242 that is coupled to the system bus 3208, but can be connected by other interfaces such as a parallel port, IEEE 1394 serial port, a game port, a USB port, an IR interface, and so forth.

A monitor 3244 or other type of display device is also connected to the system bus 3208 via an interface, such as a video adaptor 3246. The monitor 3244 may be internal or external to the computer 3202. In addition to the monitor 3244, a computer typically includes other peripheral output devices, such as speakers, printers, and so forth.

The computer 3202 may operate in a networked environment using logical connections via wire and/or wireless communications to one or more remote computers, such as a remote computer 3248. The remote computer 3248 can be a workstation, a server computer, a router, a personal computer, portable computer, microprocessor-based entertainment appliance, a peer device or other common network node, and typically includes many or all of the elements described relative to the computer 3202, although, for purposes of brevity, only a memory/storage device 3250 is illustrated. The logical connections depicted include wire/wireless connectivity to a local area network (LAN) 3252 and/or larger networks, for example, a wide area network (WAN) 3254. Such LAN and WAN networking environments are commonplace in offices and companies, and facilitate enterprise-wide computer networks, such as intranets, all of which may connect to a global communications network, for example, the Internet.

When used in a LAN networking environment, the computer 3202 is connected to the LAN 3252 through a wire and/or wireless communication network interface or adaptor 3256. The adaptor 3256 can facilitate wire and/or wireless communications to the LAN 3252, which may also include a wireless access point disposed thereon for communicating with the wireless functionality of the adaptor 3256.

When used in a WAN networking environment, the computer 3202 can include a modem 3258, or is connected to a communications server on the WAN 3254, or has other means for establishing communications over the WAN 3254, such as by way of the Internet. The modem 3258, which can be internal or external and a wire and/or wireless device, connects to the system bus 3208 via the input device interface 3242. In a networked environment, program modules depicted relative to the computer 3202, or portions thereof, can be stored in the remote memory/storage device 3250. It will be appreciated that the network connections shown are exemplary and other means of establishing a communications link between the computers can be used.

The computer 3202 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 30:
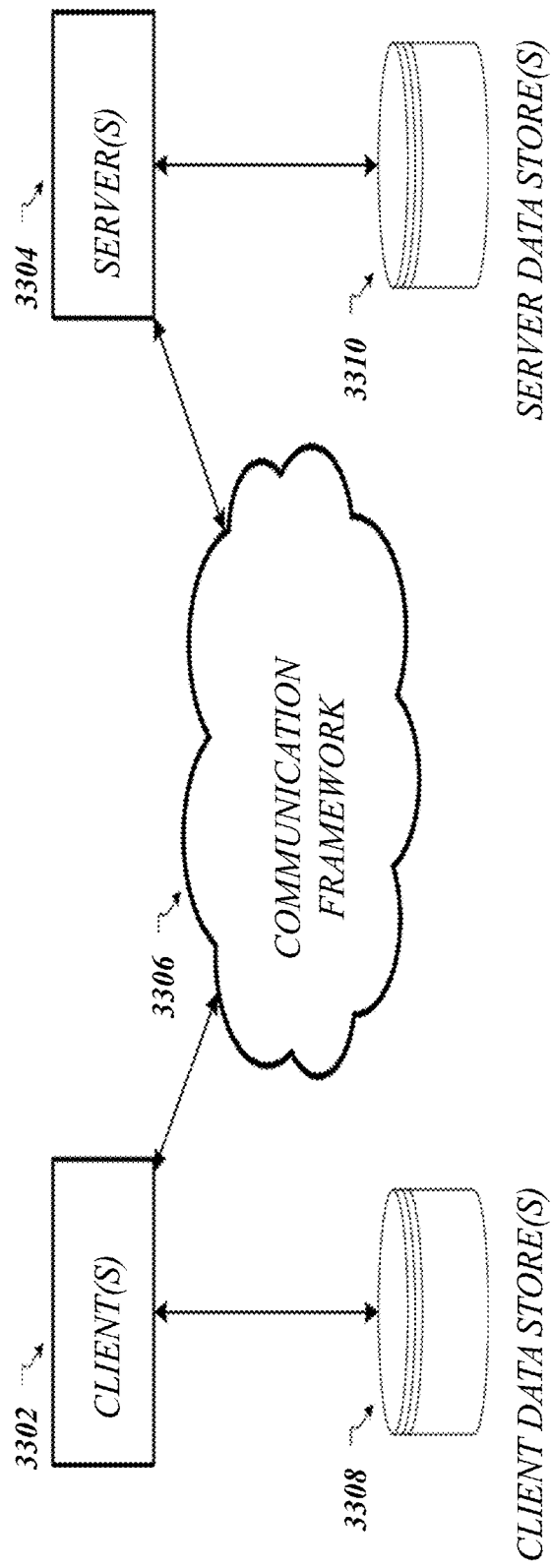
FIG. 30 illustrates an embodiment of a communications architecture.

FIG. 30 illustrates a block diagram of an exemplary communications architecture 3300 suitable for implementing various embodiments as previously described. The communications architecture 3300 includes various common communications elements, such as a transmitter, receiver, transceiver, radio, network interface, baseband processor, antenna, amplifiers, filters, power supplies, and so forth. The embodiments, however, are not limited to implementation by the communications architecture 3300.

As shown in FIG. 30, the communications architecture 3300 comprises includes one or more clients 3302 and servers 3304. The client(s) 302 and the servers 3304 are operatively connected to one or more respective client data stores 3308 and server data stores 3310 that can be employed to store information local to the respective clients 3302 and servers 3304, such as cookies and/or associated contextual information. In various embodiments, any one of servers 3304 may implement one or more of logic flows 1000, 1200-1700 of FIGS. 10, 12-16, and storage medium 3100 of FIG. 31 in conjunction with storage of data received from any one of clients 3302 on any of server data stores 3310.

The client(s) 3302 and the servers 3304 may communicate information between each other using a communication framework 3306 such as in an optical wireless communication system. The communications framework 3306 may implement any well-known communications techniques and protocols. The communications framework 3306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 3306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types such as an optical wireless communication network. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 3302 and the servers 3304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following embodiments are presented to illustrate exemplary and non-limiting aspects of the disclosure. Example 1 is directed to a receiver circuitry to correct frequency offset between a receiving camera and a transmitting LED source, comprising: a shift register to receive incoming data from the LED source, the incoming data having a plurality of symbols and a symbol rate ($f_s$), the shift register having a plurality of storage cells, each storage cell to receive and store one data bit per clock cycle, each bit of data representing a sampled pixel state and each bit of data sampled at a camera frame rate ($f_c$); a plurality of comparator logic gates to correspond to a first group of the shift register storage cells, the plurality of logic gates configured to receive a sampled bit of data from a corresponding shift register storage cell during a clock cycle; and a controller to receive an output from the first plurality of comparator logic gates to identify a frequency offset between the symbol rate ($f_s$) and the camera frame rate ($f_c$) as one of a positive, negative or neutral frequency offset, the controller configured to compensate for the frequency offset if the frequency offset is one of the positive or negative frequency offset.

Example 2 is directed to the receiver circuitry of example 1, wherein the shift register receives and stores data at a long exposure mode and switches to short exposure mode to identify a region of interest (ROI) of modulated light.

Example 3 is directed to the receiver circuitry of example 1, wherein the shift register receives a start frame delimiter (SFD) in the incoming data and synchronizes the camera frame rate ($f_c$) to the SFD.

Example 4 is directed to the receiver circuitry of example 1, wherein the plurality of comparators logic gates receive multiple sampled data and compare the sampled data with a threshold.

Example 5 is directed to the receiver circuitry of example 1, wherein the controller determines the frequency offset by comparing a sampled bit sequence of a first symbol ($S_{-3}$, $S_{-2}$, $S_{-1}$, $S_0$) of a first bit ($B_N$) with a predetermined threshold sequence.

Example 6 is directed to the receiver circuitry of example 5, wherein the controller further identifies the bit values for a prior bit ($B_{N-1}$) and a current bit decision ($B_N$).

Example 7 is directed to the receiver circuitry of example 5, wherein the controller compensates for the negative frequency offset by sampling a subsequent symbol to obtain at least three new data samplings.

Example 8 is directed to the receiver circuitry of example 5, wherein the controller compensates for the positive frequency offset by sampling a subsequent symbol to obtain at least five new data samplings and discarding a first of the five samplings.

Example 9 is directed to a tangible machine-readable non-transitory storage medium that contains instructions, which when executed by one or more processors result in performing operations to correct frequency offset between a receiving camera and a transmitting LED source, the instructions comprising: receiving an incoming light at a pixel array of an optical receiving device; identifying a modulated light from the incoming light, the modulated light received at region of interest (ROI) of the pixel array, the modulated light carrying a data stream having a plurality of symbols and a symbol rate ($f_s$); identifying a start frame delimiter (SFD) in the data stream and sampling the plurality of symbols at a camera frame rate ($f_c$); determining a frequency offset between the camera frame rate ($f_c$) and the symbol rate ($f_s$) of the data stream; identifying the frequency offset as one of a positive, negative or neutral and compensating for the frequency offset if the frequency offset is one of the positive or negative frequency offset.

Example 10 is directed to the medium of example 9, wherein the modulated light defines a variable pulse modulation (VPPM) wave to modulate the data stream into a carrier wave.

Example 11 is directed to the medium of example 9, wherein receiving an incoming light at a pixel array further comprises recording the incoming light a long exposure mode and wherein identifying modulated light further comprises switching to short exposure mode.

Example 12 is directed to the medium of example 9, wherein identifying a start frame delimiter further comprises synchronizing the receiving camera frame rate ($f_c$) to the SFD.

Example 13 is directed to the medium of example 9, wherein determining the frequency offset further comprises comparing a sampled bit sequence ($S_{-3}$, $S_{-2}$, $S_{-1}$, $S_0$) of a first bit ($B_N$) with a predetermined threshold sequence.

Example 14 is directed to the medium of example 13, wherein determining the frequency offset further comprises identifying the bit values for a prior bit ($B_{N-1}$) and a current bit decision ($B_N$).

Example 15 is directed to the medium of example 13, further comprising compensating for the negative frequency offset by sampling a subsequent symbol to obtain at least three new data samplings.

Example 16 is directed to the medium of example 13, further comprising compensating for the positive frequency offset by sampling a subsequent symbol to obtain at least five new data samplings and discarding a first of the five samplings.

Example 17 is directed to a method to correct frequency offset between a receiving camera and a transmitting LED source, the method comprising: receiving an incoming light at a pixel array of an optical receiving device; identifying a modulated light from the incoming light, the modulated light received at region of interest (ROI) of the pixel array, the modulated light carrying a data stream having a plurality of symbols and a symbol rate ($f_s$); identifying a start frame delimiter (SFD) in the data stream and sampling the plurality of symbols at a camera frame rate ($f_c$); determining a frequency offset between the camera frame rate ($f_c$) and the symbol rate ($f_s$) of the data stream; identifying the frequency offset as one of a positive, negative or neutral and compensating for the frequency offset if the frequency offset is one of the positive or negative frequency offset.

Example 18 is directed to the method of example 17, wherein the modulated light defines a variable pulse modulation (VPPM) wave to modulate the data stream into a carrier wave.

Example 19 is directed to the method of example 17, wherein receiving an incoming light at a pixel array further comprises recording the incoming light a long exposure mode and wherein identifying modulated light further comprises switching to short exposure mode.

Example 20 is directed to the method of example 17, wherein identifying the SFD further comprises synchronizing the camera frame rate ($f_c$) to the SFD.

Example 21 is directed to the method of example 17, wherein determining the frequency offset further comprises comparing a sampled bit sequence ($S_{-3}$, $S_{-2}$, $S_{-1}$, $S_0$) of a first bit ($B_N$) with a predetermined threshold sequence.

Example 22 is directed to the method of example 21, wherein determining the frequency offset further comprises identifying the bit values for a prior bit ($B_{N-1}$) and a current bit decision ($B_N$).

Example 23 is directed to the method of example 21, further comprising compensating for the negative frequency offset by sampling a subsequent symbol to obtain at least three new data samplings.

Example 24 is directed to the method of example 21, further comprising compensating for the positive frequency offset by sampling a subsequent symbol to obtain at least five new data samplings and discarding a first of the five samplings.

While the principles of the disclosure have been illustrated in relation to the exemplary embodiments shown herein, the principles of the disclosure are not limited thereto and include any modification, variation or permutation thereof.

What is claimed is:

1. A receiver circuitry to correct frequency offset between a receiving camera and a transmitting LED source, comprising:
   a shift register to receive incoming data from the LED source, the incoming data having a plurality of symbols and a symbol rate ($f_s$), the shift register having a plurality of storage cells, each storage cell to receive and store one data bit per clock cycle, each bit of data representing a sampled pixel state and each bit of data sampled at a camera frame rate ($f_c$);
   a plurality of comparator logic gates to correspond to a first group of the shift register storage cells, the plurality of logic gates configured to receive a sampled bit of data from a corresponding shift register storage cell during a clock cycle; and
   a controller to receive an output from the first plurality of comparator logic gates to identify a frequency offset between the symbol rate ($f_s$) and the camera frame rate ($f_c$) as one of a positive, negative or neutral frequency offset, the controller configured to compensate for the frequency offset if the frequency offset is one of the positive or negative frequency offset.

2. The receiver circuitry of claim 1, wherein the shift register receives and stores data at a long exposure mode and switches to short exposure mode to identify a region of interest (ROI) of modulated light.

3. The receiver circuitry of claim 1, wherein the shift register receives a start frame delimiter (SFD) in the incoming data and synchronizes the camera frame rate ($f_c$) to the SFD.

4. The receiver circuitry of claim 1, wherein the plurality of comparators logic gates receive multiple sampled data and compare the sampled data with a threshold.

5. The receiver circuitry of claim 1, wherein the controller determines the frequency offset by comparing a sampled bit sequence of a first symbol ($S_{-3}$, $S_{-2}$, $S_{-1}$, $S_0$) of a first bit ($B_N$) with a predetermined threshold sequence.

6. The receiver circuitry of claim 5, wherein the controller further identifies the bit values for a prior bit ($B_{N-1}$) and a current bit decision ($B_N$).

7. The receiver circuitry of claim 5, wherein the controller compensates for the negative frequency offset by sampling a subsequent symbol to obtain at least three new data samplings.

8. The receiver circuitry of claim 5, wherein the controller compensates for the positive frequency offset by sampling a subsequent symbol to obtain at least five new data samplings and discarding a first of the five samplings.

9. A tangible machine-readable non-transitory storage medium that contains instructions, which when executed by one or more processors result in performing operations to correct frequency offset between a receiving camera and a transmitting LED source, the instructions comprising:
   receiving an incoming light at a pixel array of an optical receiving device;
   identifying a modulated light from the incoming light, the modulated light received at region of interest (ROI) of the pixel array, the modulated light carrying a data stream having a plurality of symbols and a symbol rate ($f_s$);
   identifying a start frame delimiter (SFD) in the data stream and sampling the plurality of symbols at a camera frame rate ($f_c$);
   determining a frequency offset between the camera frame rate ($f_c$) and the symbol rate ($f_s$) of the data stream;
   identifying the frequency offset as one of a positive, negative or neutral and compensating for the frequency offset if the frequency offset is one of the positive or negative frequency offset.

10. The medium of claim 9, wherein the modulated light defines a variable pulse modulation (VPPM) wave to modulate the data stream into a carrier wave.

11. The medium of claim 9, wherein receiving an incoming light at a pixel array further comprises recording the incoming light a long exposure mode and wherein identifying modulated light further comprises switching to short exposure mode.

12. The medium of claim 9, wherein identifying a start frame delimiter further comprises synchronizing the receiving camera frame rate ($f_c$) to the SFD.

13. The medium of claim 9, wherein determining the frequency offset further comprises comparing a sampled bit sequence ($S_{-3}$, $S_{-2}$, $S_{-1}$, $S_0$) of a first bit ($B_N$) with a predetermined threshold sequence.

14. The medium of claim 13, wherein determining the frequency offset further comprises identifying the bit values for a prior bit ($B_{N-1}$) and a current bit decision ($B_N$).

15. The medium of claim 13, further comprising compensating for the negative frequency offset by sampling a subsequent symbol to obtain at least three new data samplings.

16. The medium of claim 13, further comprising compensating for the positive frequency offset by sampling a subsequent symbol to obtain at least five new data samplings and discarding a first of the five samplings.

17. A method to correct frequency offset between a receiving camera and a transmitting LED source, the method comprising:
   receiving an incoming light at a pixel array of an optical receiving device;
   identifying a modulated light from the incoming light, the modulated light received at region of interest (ROI) of the pixel array, the modulated light carrying a data stream having a plurality of symbols and a symbol rate ($f_s$);
   identifying a start frame delimiter (SFD) in the data stream and sampling the plurality of symbols at a camera frame rate ($f_c$);
   determining a frequency offset between the camera frame rate ($f_c$) and the symbol rate ($f_s$) of the data stream;
   identifying the frequency offset as one of a positive, negative or neutral and compensating for the frequency offset if the frequency offset is one of the positive or negative frequency offset.

18. The method of claim 17, wherein the modulated light defines a variable pulse modulation (VPPM) wave to modulate the data stream into a carrier wave.

19. The method of claim 17, wherein receiving an incoming light at a pixel array further comprises recording the incoming light a long exposure mode and wherein identifying modulated light further comprises switching to short exposure mode.

20. The method of claim 17, wherein identifying the SFD further comprises synchronizing the camera frame rate ($f_c$) to the SFD.

21. The method of claim 17, wherein determining the frequency offset further comprises comparing a sampled bit sequence ($S_{-3}$, $S_{-2}$, $S_{-1}$, $S_0$) of a first bit ($B_N$) with a predetermined threshold sequence.

22. The method of claim 21, wherein determining the frequency offset further comprises identifying the bit values for a prior bit ($B_{N-1}$) and a current bit decision ($B_N$).

23. The method of claim 21, further comprising compensating for the negative frequency offset by sampling a subsequent symbol to obtain at least three new data samplings.

24. The method of claim 21, further comprising compensating for the positive frequency offset by sampling a subsequent symbol to obtain at least five new data samplings and discarding a first of the five samplings.

\* \* \* \* \*